(12) United States Patent
Cravener et al.

(10) Patent No.: US 11,975,831 B2
(45) Date of Patent: *May 7, 2024

(54) OVER-CENTERING BLADE LOCK

(71) Applicant: Textron Innovations Inc., Providence, RI (US)

(72) Inventors: Kyle Thomas Cravener, Arlington, TX (US); Andrew Maresh, Colleyville, TX (US)

(73) Assignee: Textron Innovations Inc., Providence, RI (US)

(*) Notice: Subject to any disclaimer, the term of this patent is extended or adjusted under 35 U.S.C. 154(b) by 0 days.

This patent is subject to a terminal disclaimer.

(21) Appl. No.: 17/994,289

(22) Filed: Nov. 26, 2022

(65) Prior Publication Data
US 2023/0086036 A1 Mar. 23, 2023

Related U.S. Application Data

(62) Division of application No. 16/599,471, filed on Oct. 11, 2019, now Pat. No. 11,535,370.

(51) Int. Cl.
*B64C 29/00* (2006.01)
*B64C 11/20* (2006.01)

(52) U.S. Cl.
CPC .......... *B64C 29/0033* (2013.01); *B64C 11/20* (2013.01)

(58) Field of Classification Search
CPC ..... B64D 29/0033; B64C 27/50; B64C 27/39; B64C 11/20
See application file for complete search history.

(56) References Cited

U.S. PATENT DOCUMENTS

| | | | |
|---|---|---|---|
| 141,191 A | 7/1873 | Wilson |
| 2,102,325 A | 12/1937 | Kylstra |
| 2,354,474 A | 7/1944 | Noble et al. |
| 2,946,391 A | 7/1960 | Lemont, Jr. |
| 3,217,240 A | 11/1965 | Grant et al. |
| 3,415,324 A | 12/1968 | Austin, Jr. |
| 3,610,606 A | 10/1971 | Andrews |
| 3,736,010 A | 5/1973 | Larkin |

(Continued)

FOREIGN PATENT DOCUMENTS

| DE | 202012103224 U1 | 9/2012 |
|---|---|---|
| EP | 1805427 A1 | 7/2007 |

(Continued)

OTHER PUBLICATIONS

Aurora Bearing Company; "Terms and Definitions—Aurora Bearing Rod Ends, Spherical Bearings & Bushings"; Sep. 26, 2015; http://www.aurorabearing.com/technical-terms-and-definitions.html.; 3 pages.

*Primary Examiner* — Richard Green
*Assistant Examiner* — Ashesh Dangol
(74) *Attorney, Agent, or Firm* — Bradley Arant Boult Cummings LLP

(57) ABSTRACT

An exemplary blade lock for a tiltrotor aircraft to enable and disable a folding degree of freedom and a pitching degree of freedom of a rotor blade assembly includes a link pivotally connected to a lever and a bellcrank, where the link is in a center position when the lever is in a locked position disabling the folding degree of freedom and the lever is secured in the locked position when the link is positioned in an over-center position.

18 Claims, 18 Drawing Sheets

(56) References Cited

U.S. PATENT DOCUMENTS

| | | | |
|---|---|---|---|
| 3,786,695 A | 1/1974 | Barrett, Jr. |
| 3,866,650 A | 2/1975 | Larkin |
| 4,456,233 A | 6/1984 | Muller |
| 5,026,254 A | 6/1991 | Ford et al. |
| 5,174,677 A | 12/1992 | Doolin et al. |
| 5,431,540 A | 7/1995 | Doolin et al. |
| 5,454,153 A | 10/1995 | Noel |
| 5,460,487 A | 10/1995 | Schmaling et al. |
| 5,505,106 A | 4/1996 | Herman |
| 5,702,196 A | 12/1997 | Petercsak |
| 5,727,926 A | 3/1998 | Ide et al. |
| 5,868,351 A * | 2/1999 | Stamps | B64C 27/50 |
| | | | 244/6 |
| 5,946,981 A | 9/1999 | Ide et al. |
| 6,659,399 B1 | 12/2003 | Bagnoli et al. |
| 6,666,649 B2 | 12/2003 | Arnold |
| 6,953,313 B2 | 10/2005 | Tylosky |
| 7,207,854 B1 | 4/2007 | Anderson, Jr. et al. |
| 7,524,169 B2 | 4/2009 | Podgurski |
| 8,371,767 B2 | 2/2013 | Uhl et al. |
| 9,586,680 B2 | 3/2017 | Mondet |
| 10,239,609 B2 | 3/2019 | Davis et al. |
| 10,336,447 B2 | 7/2019 | Tzeng et al. |
| 10,377,477 B2 | 8/2019 | Biser et al. |
| 10,676,110 B2 | 6/2020 | Huck |
| 2002/0187041 A1 | 12/2002 | Arnold |
| 2004/0261554 A1 | 12/2004 | Tylosky |
| 2005/0178215 A1 | 8/2005 | Mayer et al. |
| 2007/0166162 A1 | 7/2007 | Podgurski |
| 2008/0115622 A1 | 5/2008 | Uhl et al. |
| 2009/0205404 A1 | 8/2009 | Swadling |
| 2009/0218777 A1 | 9/2009 | Wood |
| 2012/0184160 A1 | 7/2012 | Dudra et al. |
| 2012/0224913 A1 | 9/2012 | Haller |
| 2014/0064914 A1 | 3/2014 | Arnold et al. |
| 2016/0152329 A1 | 6/2016 | Tzeng et al. |
| 2017/0144746 A1 * | 5/2017 | Schank | B64D 27/20 |
| 2019/0016441 A1 | 1/2019 | Schank et al. |
| 2019/0047691 A1 | 2/2019 | Schank et al. |
| 2019/0047692 A1 | 2/2019 | Schank et al. |
| 2019/0055717 A1 | 2/2019 | Amat Holgado et al. |
| 2020/0317330 A1 | 10/2020 | Clarke et al. |

FOREIGN PATENT DOCUMENTS

| | | |
|---|---|---|
| EP | 2067697 A1 | 6/2009 |
| JP | H06-156391 A | 6/1994 |
| WO | WO-2006042750 A1 | 4/2006 |

\* cited by examiner

OVER-CENTERING BLADE LOCK

CROSS-REFERENCE TO RELATED APPLICATION

This application is a divisional of U.S. application Ser. No. 16/599,471, filed on Oct. 11, 2019. The contents of U.S. application Ser. No. 16/599,471 are incorporated by reference in their entirety herein for all purposes.

TECHNICAL FIELD

This disclosure relates in general to the field of aircraft, and more particularly, to tiltrotor aircraft operable for vertical takeoff and landing in a helicopter mode and high-speed forward cruising in an airplane flight mode and, in particular, to tiltrotor aircraft operable for transitions between rotary and non-rotary flight modes.

BACKGROUND

This section provides background information to facilitate a better understanding of the various aspects of the disclosure. It should be understood that the statements in this section of this document are to be read in this light, and not as admissions of prior art.

Fixed-wing aircraft, such as airplanes, are capable of flight using wings that generate lift responsive to the forward airspeed of the aircraft, which is generated by thrust from one or more jet engines or propellers. The wings generally have an airfoil cross section that deflects air downward as the aircraft moves forward, generating the lift force to support the aircraft in flight. Fixed-wing aircraft, however, typically require a runway that is hundreds or thousands of feet long for takeoff and landing.

Unlike fixed-wing aircraft, vertical takeoff and landing (VTOL) aircraft do not require runways. Instead, VTOL aircraft are capable of taking off, hovering and landing vertically. One example of a VTOL aircraft is a helicopter which is a rotorcraft having one or more rotors that provide lift and thrust to the aircraft. The rotors not only enable hovering and vertical takeoff and landing, but also enable forward, backward and lateral flight. These attributes make helicopters highly versatile for use in congested, isolated or remote areas. Helicopters, however, typically lack the forward airspeed of fixed-wing aircraft due to the phenomena of retreating blade stall and advancing blade compression.

Tiltrotor aircraft attempt to overcome this drawback by utilizing proprotors that can change their plane of rotation based on the operation being performed. Tiltrotor aircraft typically have a pair of nacelles mounted near the outboard ends of a fixed wing with each nacelle housing a propulsion system that provides torque and rotational energy to a proprotor. The nacelles are rotatable relative to the fixed wing such that the proprotors have a generally horizontal plane of rotation providing vertical thrust for takeoff, hovering and landing, much like a conventional helicopter, and a generally vertical plane of rotation providing forward thrust for cruising in forward flight with the fixed wing providing lift, much like a conventional propeller driven airplane. It has been found; however, that forward airspeed induced proprotor aeroelastic instability is a limiting factor relating to the maximum airspeed of tiltrotor aircraft in forward flight.

SUMMARY

An exemplary blade lock for a tiltrotor aircraft to enable and disable a folding degree of freedom and a pitching degree of freedom of a rotor blade assembly includes a link pivotally connected to a lever and a bellcrank, where the link is in a center position when the lever is in a locked position disabling the folding degree of freedom and the lever is secured in the locked position when the link is positioned in an over-center position.

An exemplary tiltrotor aircraft having rotary and non-rotary flight modes includes a rotor assembly having a gimballing degree of freedom relative to a mast, the rotor assembly including a plurality of rotor blade assemblies each having a pitching degree of freedom and a folding degree of freedom; a gimbal lock positioned about the mast, the gimbal lock having a disengaged position relative to the rotor assembly, enabling the gimballing degree of freedom, in the rotary flight mode and an engaged position relative to the rotor assembly, disabling the gimballing degree of freedom, in the non-rotary flight mode; a blade stop assembly positioned about the mast, the blade stop assembly including a plurality of arms having a radially contracted orientation, in the rotary flight mode and a radially extended orientation, in the non-rotary flight mode; a blade lock assembly operably associated with each rotor blade assembly, each blade lock assembly having a fold locked position, disabling the folding degree of freedom and enabling the pitching degree of freedom of the respective rotor blade assembly, in the rotary flight mode and a pitch locked position, enabling the folding degree of freedom and disabling the pitching degree of freedom of the respective rotor blade assembly, in the non-rotary flight mode; and the blade lock assembly comprising a link pivotally connected to a pitch lock and a fold lock, wherein the link is in a center position when the fold lock is in the fold locked position and the fold lock is secured in the fold locked position when the link is positioned over-center position and the pitch lock contacts a hard stop.

An exemplary method for enabling and disabling a folding degree of freedom and a pitching degree of freedom of a rotor blade assembly of a tiltrotor aircraft includes rotating a blade lock comprising a pitch lock pivotally connected to a fold lock by a link from a pitch locked position to a fold locked position, where in the fold locked position the link is located in a center position and rotating the pitch lock into contact with a hard stop thereby positioning the link in an over-center position.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1A:
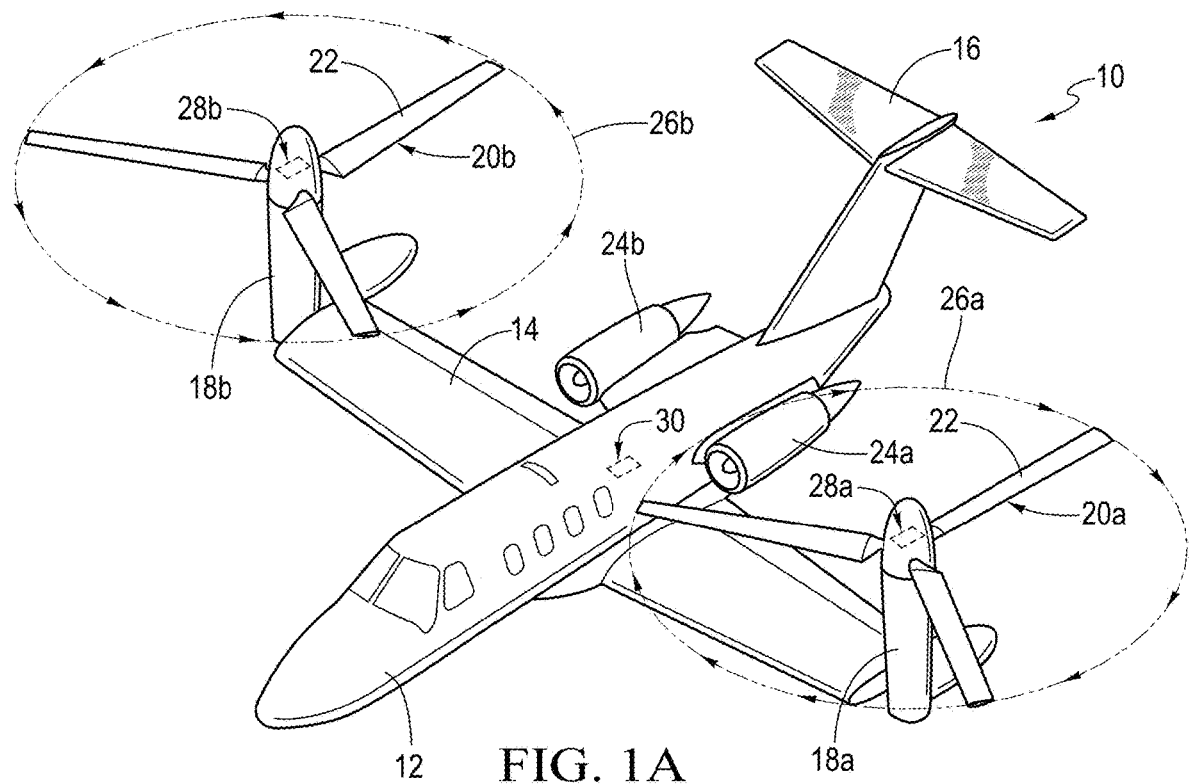
FIGS. 1A-1D are schematic illustrations of an exemplary tiltrotor aircraft in various flight modes in accordance with aspects of the disclosure.

It is to be understood that the following disclosure provides many different embodiments, or examples, for implementing different features of various illustrative embodiments. Specific examples of components and arrangements are described below to simplify the disclosure. These are, of course, merely examples and are not intended to be limiting. For example, a figure may illustrate an exemplary embodiment with multiple features or combinations of features that are not required in one or more other embodiments and thus a figure may disclose one or more embodiments that have fewer features or a different combination of features than the illustrated embodiment. Embodiments may include some but not all the features illustrated in a figure and some embodiments may combine features illustrated in one figure with features illustrated in another figure. Therefore, combinations of features disclosed in the following detailed description may not be necessary to practice the teachings in the broadest sense and are instead merely to describe particularly representative examples. In addition, the disclosure may repeat reference numerals and/or letters in the various examples. This repetition is for the purpose of simplicity and clarity and does not itself dictate a relationship between the various embodiments and/or configurations discussed.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "inboard," "outboard," "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the terms "connect," "connection," "connected," "in connection with," and "connecting" may be used to mean in direct connection with or in connection with via one or more elements. Similarly, the terms "couple," "coupling," and "coupled" may be used to mean directly coupled or coupled via one or more elements.

Figure 1B:
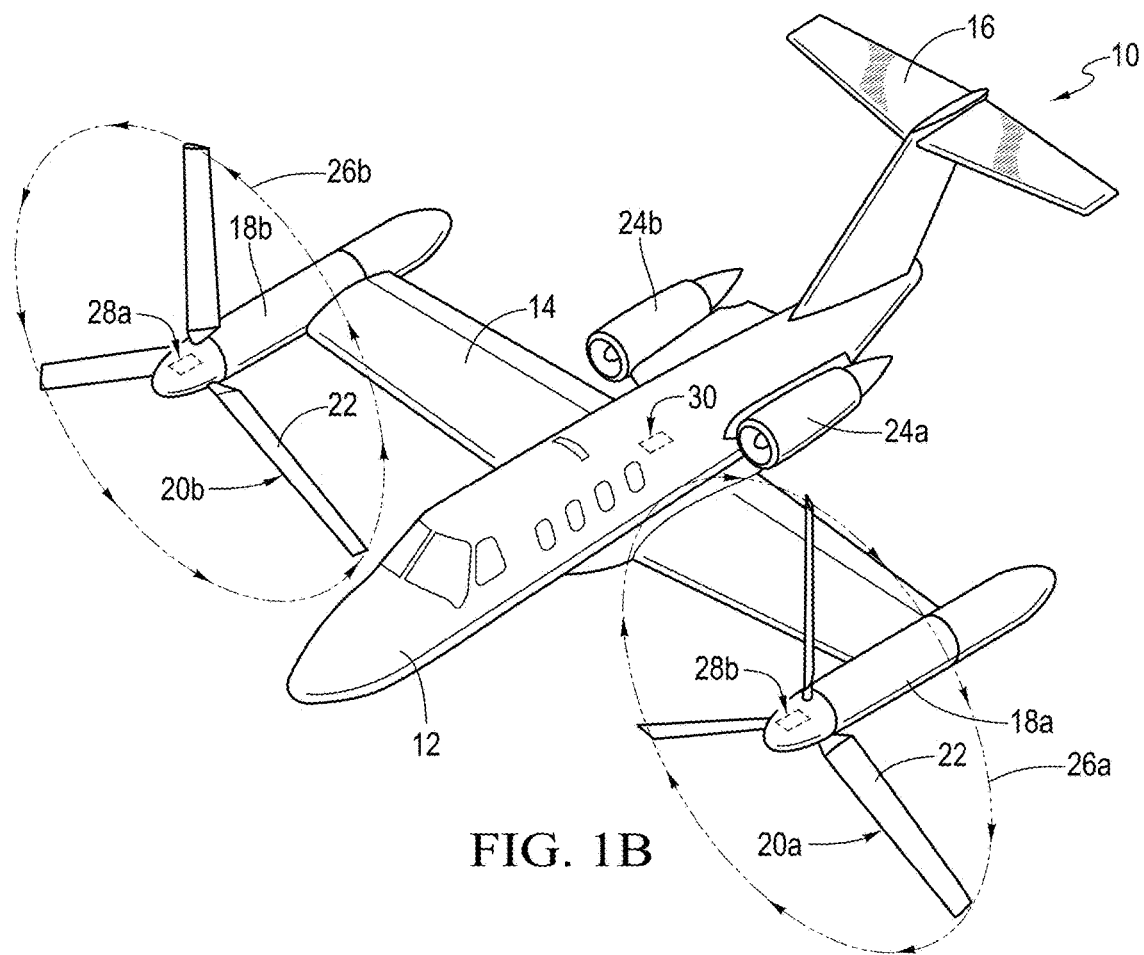
Figure 1C:
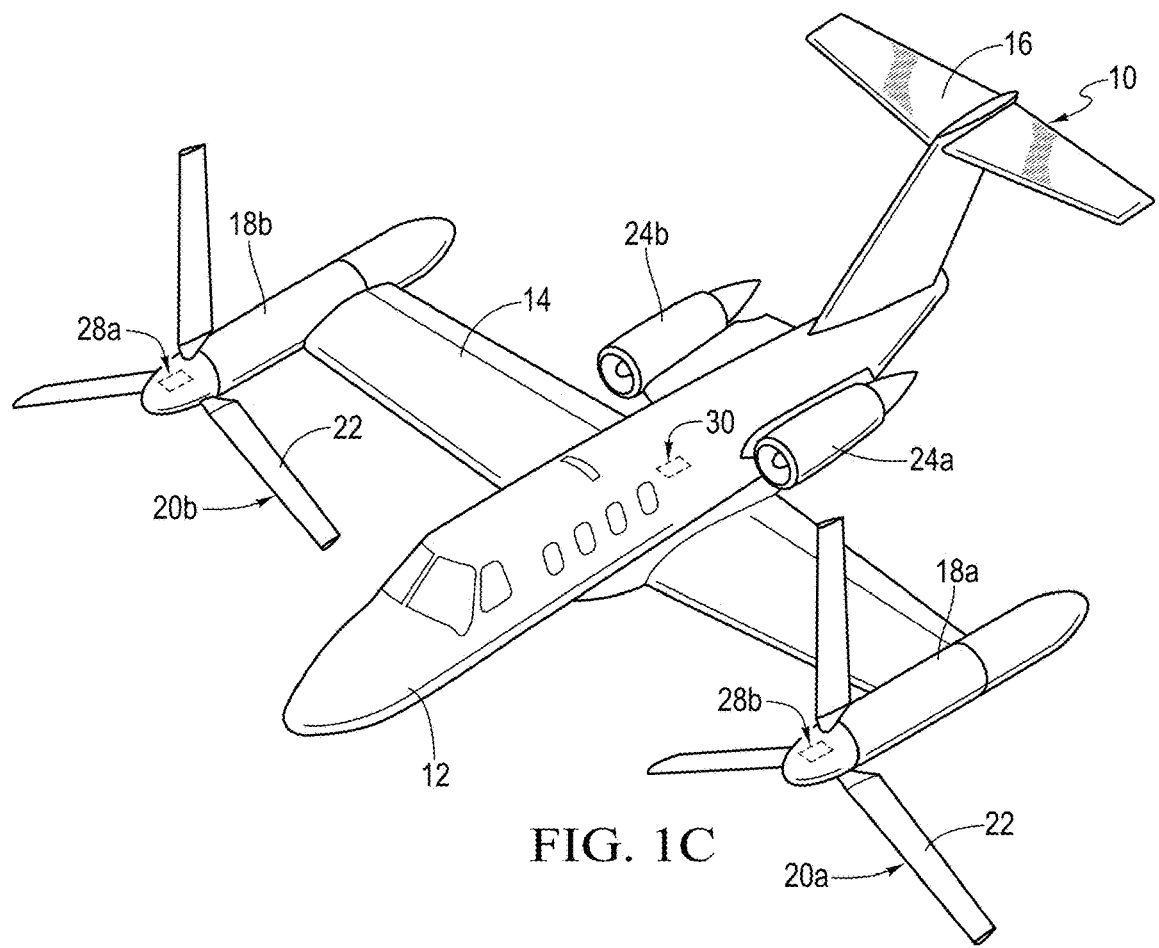
Figure 1D:
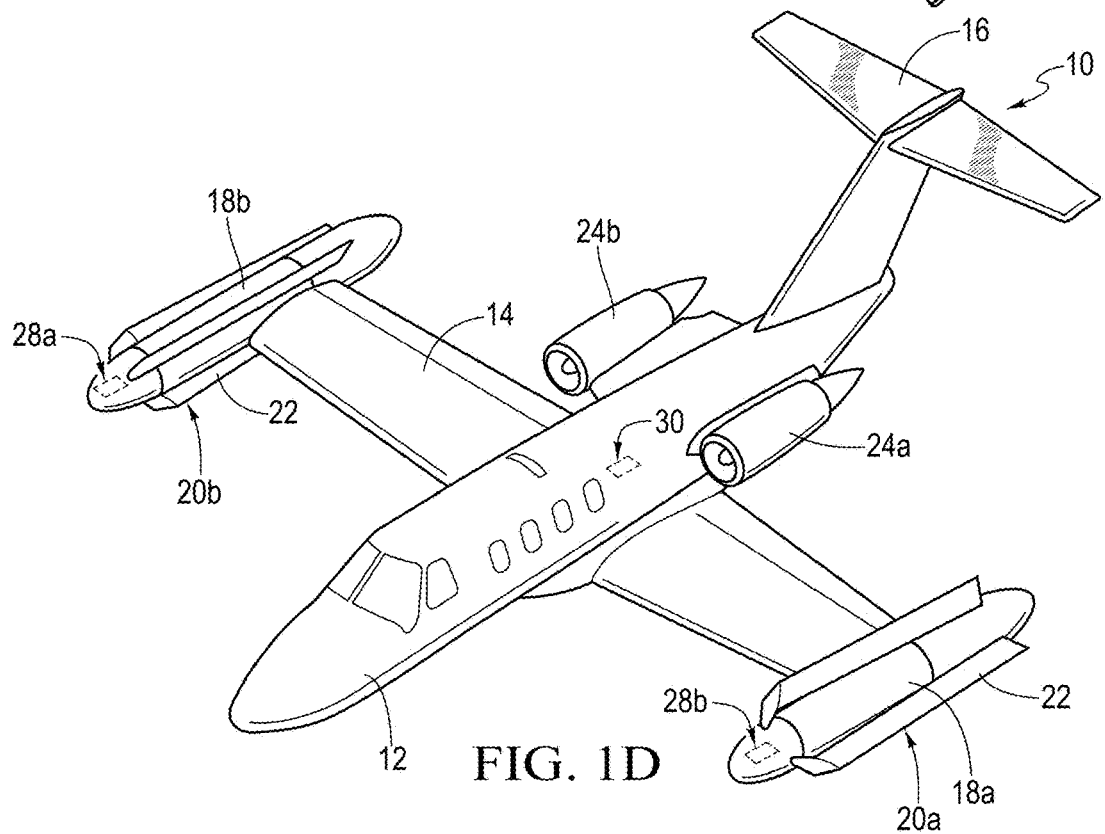

Referring to FIGS. 1A-1D in the drawings, a tiltrotor aircraft is schematically illustrated and generally designated 10. Aircraft 10 includes a fuselage 12, a wing 14 and a tail assembly 16 including control surfaces operable for horizontal and/or vertical stabilization during forward flight. Located proximate the outboard ends of wing 14 are pylon assemblies 18a, 18b that are rotatable relative to wing 14 between a generally vertical orientation, as best seen in FIG. 1A, and a generally horizontal orientation, as best seen in FIGS. 1B-1D. Pylon assemblies 18a, 18b each house a portion of the drive system that is used to rotate proprotor assemblies 20a, 20b, respectively. Each proprotor assembly 20a, 20b includes a plurality of proprotor blades 22 that are operable to be rotated, as best seen in FIGS. 1A-1B, operable to be feathered, as best seen in FIG. 1C and operable to be folded, as best seen in FIG. 1D. In the illustrated embodiment, proprotor assembly 20a is rotated responsive to torque and rotational energy provided by engine 24a and proprotor assembly 20b is rotated responsive to torque and rotational energy provided by engine 24b. Engines 24a, 24b are located proximate an aft portion of fuselage 12. Engines 24a, 24b are operable in a turboshaft mode, as best seen in FIGS. 1A-1B and a turbofan mode, as best seen in FIGS. 1C-1D.

FIG. 1A illustrates aircraft 10 in VTOL or helicopter flight mode, in which proprotor assemblies 20a, 20b are rotating in a substantially horizontal plane to provide a lifting thrust, such that aircraft 10 flies much like a conventional helicopter. In this configuration, engines 24a, 24b are operable in turboshaft mode wherein hot combustion gases in each engine 24a, 24b cause rotation of a power turbine coupled to an output shaft that is used to power the drive system coupled to the respective proprotor assemblies 20a, 20b. Thus, in this configuration, aircraft 10 is considered to be in a rotary flight mode. FIG. 1B illustrates aircraft 10 in proprotor forward flight mode, in which proprotor assemblies 20a, 20b are rotating in a substantially vertical plane to provide a forward thrust enabling wing 14 to provide a lifting force responsive to forward airspeed, such that aircraft 10 flies much like a conventional propeller driven aircraft. In this configuration, engines 24a, 24b are operable in the turboshaft mode and aircraft 10 is considered to be in the rotary flight mode.

In the rotary flight mode of aircraft 10, proprotor assemblies 20a, 20b rotate in opposite directions to provide torque balancing to aircraft 10. For example, when viewed from the front of aircraft 10 in proprotor forward flight mode (FIG. 1B) or from the top in helicopter mode (FIG. 1A), proprotor assembly 20a rotates clockwise, as indicated by motion arrows 26a, and proprotor assembly 20b rotates counterclockwise, as indicated by motion arrows 26b. In the illustrated embodiment, proprotor assemblies 20a, 20b each include three proprotor blades 22 that are equally spaced apart circumferentially at approximately 120 degree intervals. It should be understood by those having ordinary skill in the art, however, that the proprotor assemblies of the present disclosure could have proprotor blades with other designs and other configurations including proprotor assemblies having four, five or more proprotor blades. In addition, it should be appreciated that aircraft 10 can be operated such that proprotor assemblies 20a, 20b are selectively positioned between proprotor forward flight mode and helicopter mode, which can be referred to as a conversion flight mode.

A flight control computer 30 is schematically shown in fuselage 12, but it should be appreciated that flight control computer 30 may take a number of forms and exist in a variety of locations within aircraft 10. Similarly, although flight control computer 30 is illustrated singly, flight control computer 30 can be illustrative of two, three, four or any other suitable number of flight control computers in aircraft 10, which computers can be located in same, similar or different locations within fuselage 12 or elsewhere in aircraft 10.

Flight control computer 30 is configured to control and communicate with various systems within aircraft 10 including, for example, local control systems 28a and 28b. Local control systems 28a and 28b are schematically shown in the proprotor assemblies 20a and 20b, respectively. The local control systems 28a and 28b can each be communicably coupled to the flight control computer 30 and provide closed-loop control of controllable elements located within the proprotor assemblies 20a and 20b. The controllable elements within the proprotor assemblies 20a and 20b can include any structural feature operable to move and/or effect change such as, for example, blade locks, a gimbal lock, trailing-edge flaps, twistable blades, independently controllable elements attached or connected to blades, combinations of the foregoing and/or the like.

The local control systems 28a and 28b can include, inter alia, actuators that control motion of the controllable elements in the proprotor assemblies 20a and 20b, sensors that provide feedback data related to the controllable elements and control computers that operate the actuators, for example, by transmitting control signals to the actuators. Flight control computer 30 and the local control systems 28a and 28b can collaboratively provide a variety of redundant control methods relative to the controllable elements in the proprotor assemblies 20a and 20b.

FIG. 1C illustrates aircraft 10 in transition between proprotor forward flight mode and airplane forward flight mode, in which engines 24a, 24b have been disengaged from proprotor assemblies 20a, 20b and proprotor blades 22 of proprotor assemblies 20a, 20b have been feathered, or oriented to be streamlined in the direction of flight, such that proprotor blades 22 act as brakes to aerodynamically stop the rotation of proprotor assemblies 20a, 20b. In this configuration, engines 24a, 24b are operable in turbofan mode wherein hot combustion gases in each engine 24a, 24b cause rotation of a power turbine coupled to an output shaft that is used to power a turbofan that forces bypass air through a fan duct to create forward thrust enabling wing 14 to provide a lifting force responsive to forward airspeed, such that aircraft 10 flies much like a conventional jet aircraft. Thus, in this configuration, aircraft 10 is considered to be in a non-rotary flight mode. FIG. 1D illustrates aircraft 10 in airplane forward flight mode, in which proprotor blades 22 of proprotor assemblies 20a, 20b have been folded to be oriented substantially parallel to respective pylon assemblies 18a, 18b to minimize the drag force generated by proprotor blades 22. In this configuration, engines 24a, 24b are operable in the turbofan mode and aircraft 10 is considered to be in the non-rotary flight mode. The forward cruising speed of aircraft 10 can be significantly higher in airplane forward flight mode versus proprotor forward flight mode as the forward airspeed induced proprotor aeroelastic instability is overcome.

Even though aircraft 10 has been described as having two engines fixed to the fuselage each operating one of the proprotor assemblies in the rotary flight mode, it should be understood by those having ordinary skill in the art that other engine arrangements are possible and are considered to be within the scope of the present disclosure including, for example, having a single engine that provides torque and rotational energy to both of the proprotor assemblies. In addition, even though proprotor assemblies 20a, 20b are illustrated in the context of tiltrotor aircraft 10, it should be understood by those having ordinary skill in the art that the proprotor assemblies disclosed herein can be implemented on other tiltrotor aircraft including, for example, quad tiltrotor aircraft having an additional wing member aft of wing 14, unmanned tiltrotor aircraft or other tiltrotor aircraft configurations.

Referring to FIGS. 2A-2G of the drawings, an exemplary mechanism for transitioning a tiltrotor aircraft between rotary and non-rotary flight modes is depicted and generally designated 100. In the illustrated embodiment, a rotor assembly 102 is depicted as a gimbal mounted, three bladed rotor assembly having a gimballing degree of freedom relative to a mast 104. Rotor assembly 102 includes a rotor hub 106 that is coupled to and operable to rotate with mast 104. Rotor hub 106 has a conical receptacle 108 extending from a lower portion thereof. Rotor hub 106 includes three arms 110 each of which support a rotor blade assembly 112, only one being visible in the figures. Each rotor blade assembly 112 includes a cuff 114 and a rotor blade 116 that is pivotably coupled to cuff 114 by a connection member depicted as pin 118. As discussed herein, rotor blade assembly 112 has a pitching degree of freedom during rotary flight and a folding degree of freedom during non-rotary flight.

The pitching and folding degrees of freedom of rotor blade assembly 112 are realized using the highly reliable operation of swash plate 120. Swash plate 120 includes a non-rotating lower swash plate element 122 and a rotating upper swash plate element 124. Swash plate element 124 is operably coupled to each rotor blade assembly 112 at cuff 114 via a pitch link 126 and a pitch horn 128, only one such connection being visible in the figures. A control system including swash plate actuators (not pictured) is coupled to swash plate element 122. The control system operates responsive to pilot input to raise, lower and tilt swash plate element 122 and thus swash plate element 124 relative to mast 104. These movements of swash plate 120 collectively and cyclically control the pitch of rotor blade assemblies 112 during rotary flight and fold rotor blade assemblies 112 during non-rotary flight.

Figure 2A:
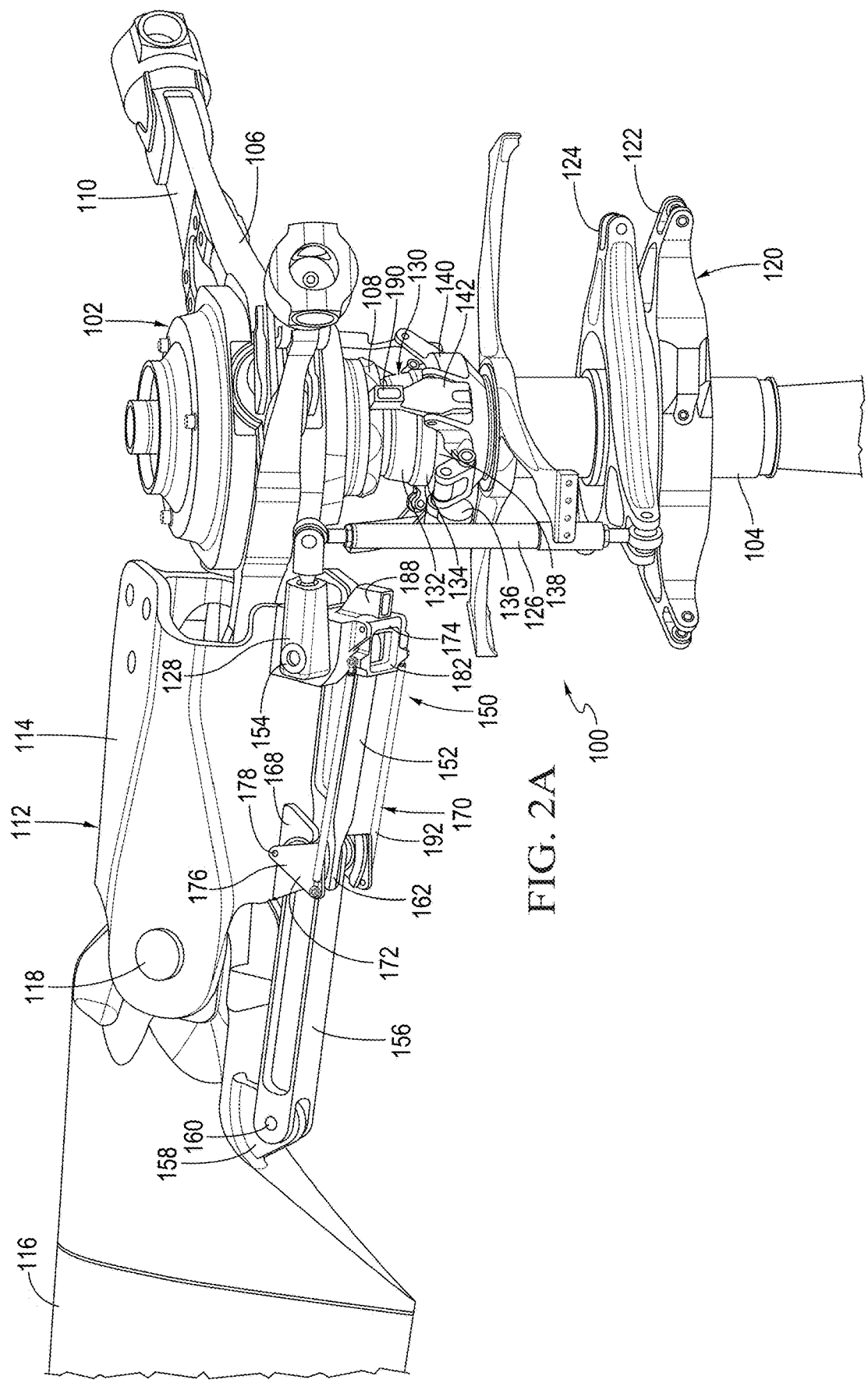
FIGS. 2A-2G are isometric views of an exemplary mechanism for transitioning a tiltrotor aircraft between rotary and non-rotary flight modes, in various positions, in accordance with aspects of the disclosure.
Figure 2B:
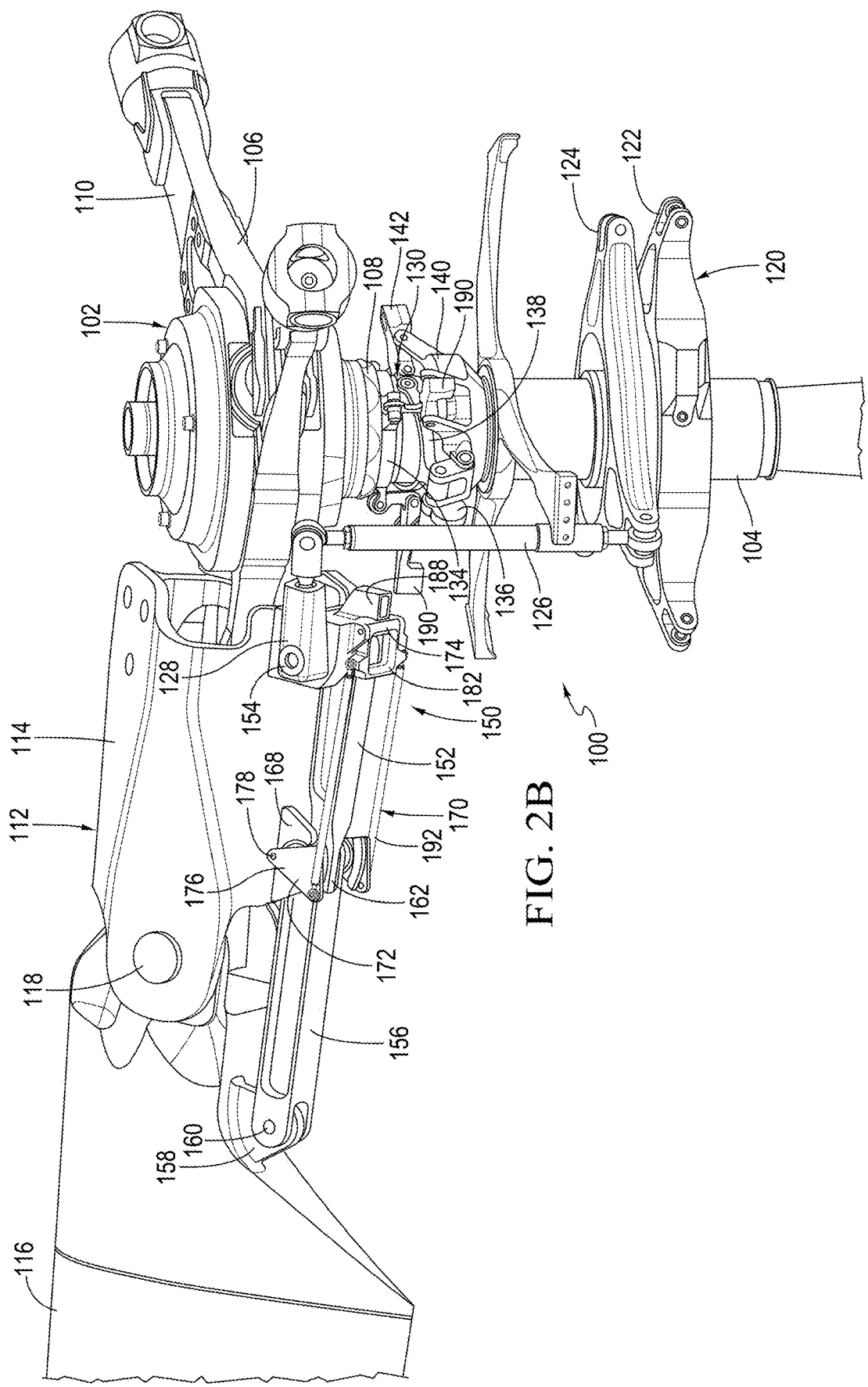

Transitioning mechanism 100 includes a gimbal lock 130 that is coupled to and operable to rotate with mast 104. Gimbal lock 130 includes a conical ring 132, an actuation ring 134 and an actuator 136 including a lift ring 138. Gimbal lock 130 is operable to selectively enable and disable the gimballing degree of freedom of rotor assembly 102 relative to mast 104. As best seen in FIG. 2A, gimbal lock 130 is disengaged from rotor assembly 102, which enables the gimballing degree of freedom of rotor assembly 102. In this configuration, there is an axial separation between conical ring 132 of gimbal lock 130 and conical receptacle 108 of rotor hub 106 such that any teetering or flapping motion of rotor assembly 102 is not impacted by gimbal lock 130. When it is desired to transition the tiltrotor aircraft from the rotary flight mode and the non-rotary flight mode, actuator 136 is operated to cause lift ring 138 to raise actuation ring 134, which in turn raises conical ring 132 into conical receptacle 108 of rotor hub 106. In this configuration, as best seen in FIG. 2B, gimbal lock 130 is engaged with rotor assembly 102, which disables the gimballing degree of freedom of rotor assembly 102 relative to mast 104 for non-rotary flight. In the illustrated embodiment, conical ring 132 has a conical geometry that is configured to mate with a similar geometry of receptacle 108 thus disabling the gimballing degree of freedom of rotor assembly 102 relative to mast 104. It should be appreciated, however, that the exact mating geometry of conical ring 132 and receptacle 108 is implementation specific and not limited to the illustrated geometry.

Figure 2C:
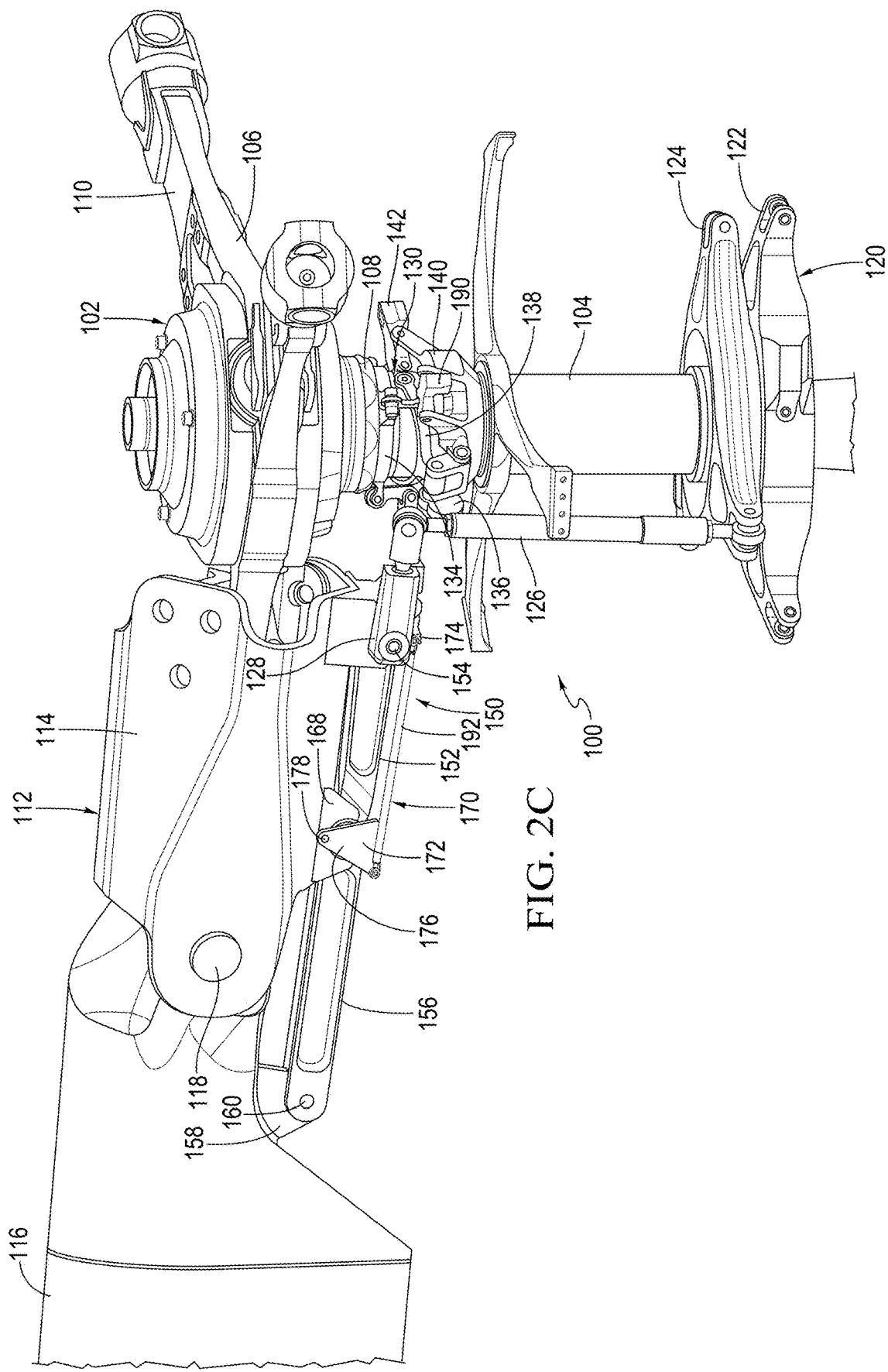

Transitioning mechanism 100 also includes a blade stop assembly 140 that is coupled to and operable to rotate with mast 104. Blade stop assembly 140 includes three arms 142 that correspond to the three rotor blade assemblies 112 of rotor assembly 102. In the illustrated embodiment, blade stop assembly 140 is integrated with gimbal lock 130 and shares actuation ring 134, actuator 136 and lift ring 138 therewith, such that operation of blade stop assembly 140 occurs together with the operation of gimbal lock 130. It should be appreciated, however, that a blade stop assembly and a gimbal lock for use with the embodiments disclosed herein could alternatively operate independent of one another. As best seen in FIG. 2A, arms 142 of blade stop assembly 140 have a radially contracted orientation, which provides clearance for rotor blade assemblies 112 during rotary flight. When it is desired to transition the tiltrotor aircraft from the rotary flight mode and the non-rotary flight mode, actuator 136 is operated to cause lift ring 138 to raise actuation ring 134, which in turn shifts arms 142 from the radially contracted orientation to a radially extended orientation, as best seen in FIG. 2B. In this configuration, arms 142 of blade stop assembly 140 will each engage a cuff 114 of a rotor blade assembly 112 upon feathering the rotor blade assemblies 112 responsive to lowering swash plate 120, as best seen in FIG. 2C. In this manner, blade stop assembly 140 provides a positive stop for rotor blade assemblies 112.

Referring additionally to FIGS. 3A-3E, an exemplary transitioning mechanism 100 includes three blade lock assemblies 150, only one being visible in the figures. Each blade lock assembly 150 is selectively operable to enable and disable the folding degree of freedom and the pitching degree of freedom of the respective rotor blade assembly 112. As illustrated, each blade lock assembly 150 includes a crank 152 that is rotatably coupled to cuff 114 and rotatable with pitch horn 128 via a connection member depicted as pin 154. In this manner, rotation of crank 152 is responsive to the rise and fall of swash plate 120 in non-rotary flight. Each blade lock assembly 150 also includes a link 156 that is rotatably coupled to rotor blade 116 at lug 158 via a connection member depicted as pin 160. Crank 152 and link 156 are coupled together at a pivot joint 162. In the illustrated embodiment, coincident with pivot joint 162, link 156 includes a pair of outwardly extending flanges 164 each having a roller element 166 rotatably coupled thereto. Each flange 164 is receivable in a seat 168 of cuff 114 when it is desired to disable the folding degree of freedom of rotor blade assembly 112. Preferably, an arch shaped geometry of the contact surface of each seat 168 is sized such that a fully engaged flange 164 seated therein will have two points of contact therewith providing a stiff connection, thereby minimizing any vibrations and/or relative movement between the parts.

Figure 3A:
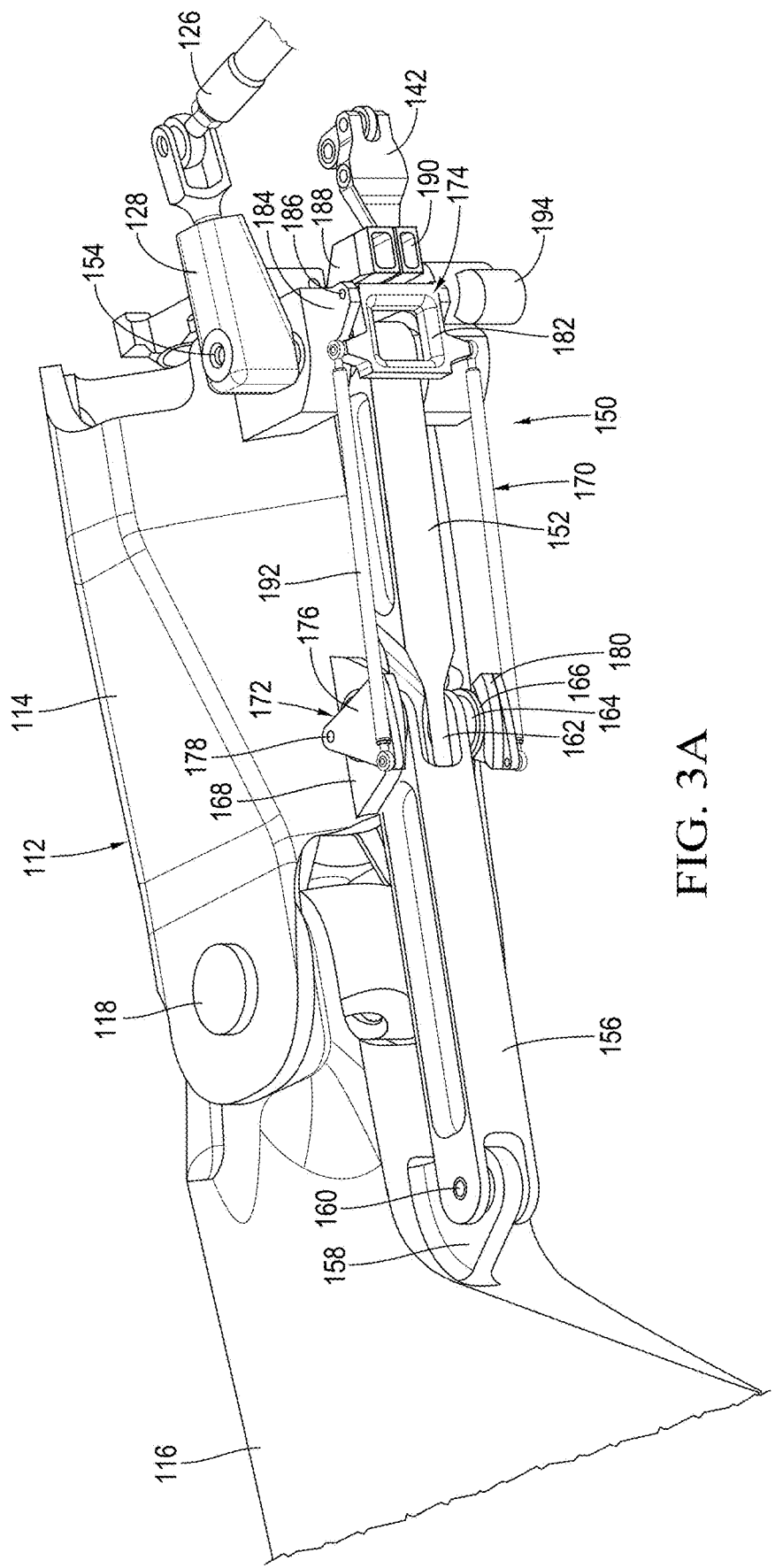
FIGS. 3A-3E are isometric views of an exemplary blade lock assembly of a mechanism for transitioning a tiltrotor aircraft between rotary and non-rotary flight modes, in various positions, in accordance with aspects of the disclosure.
Figure 3B:
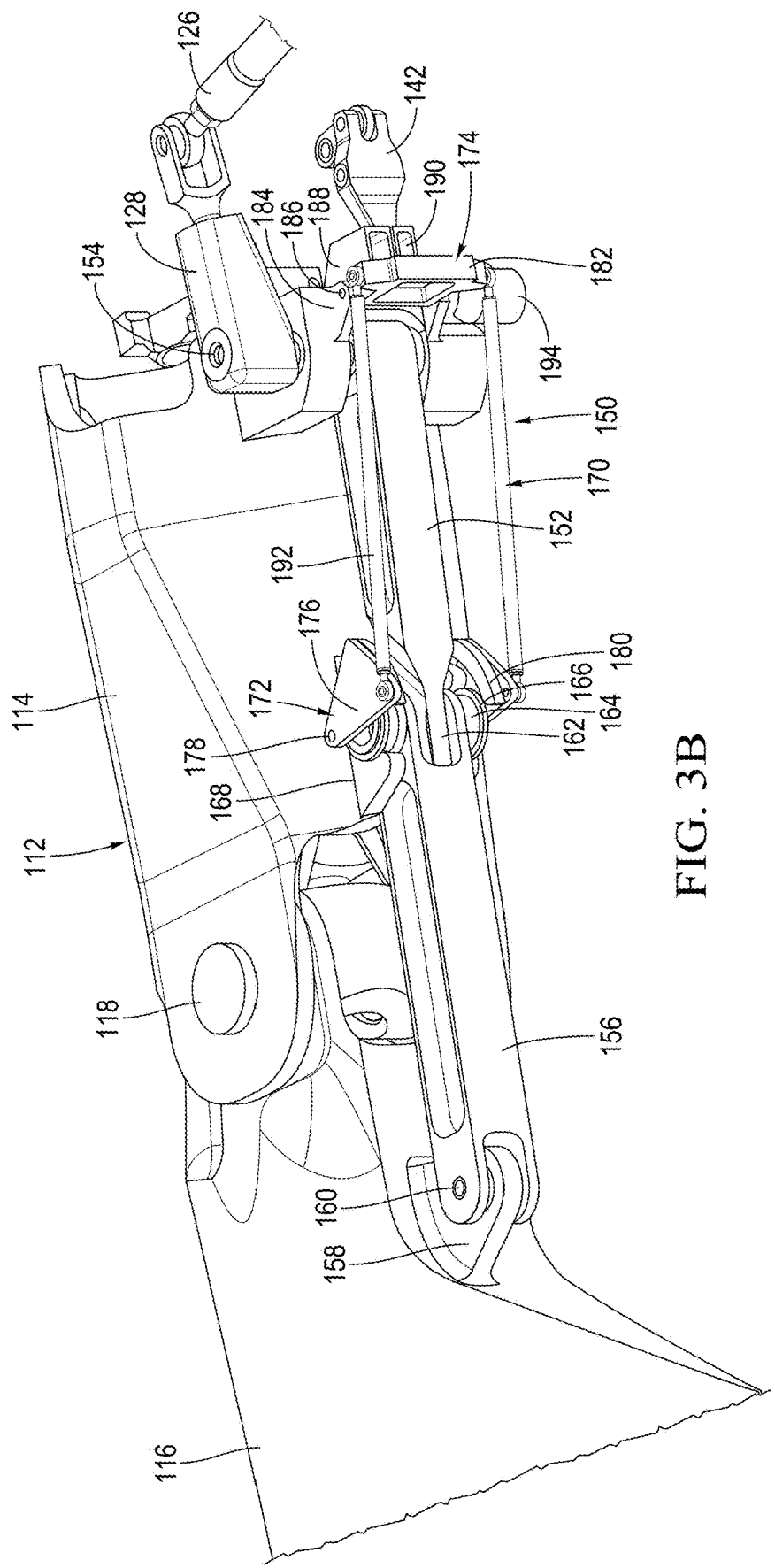
Figure 3C:
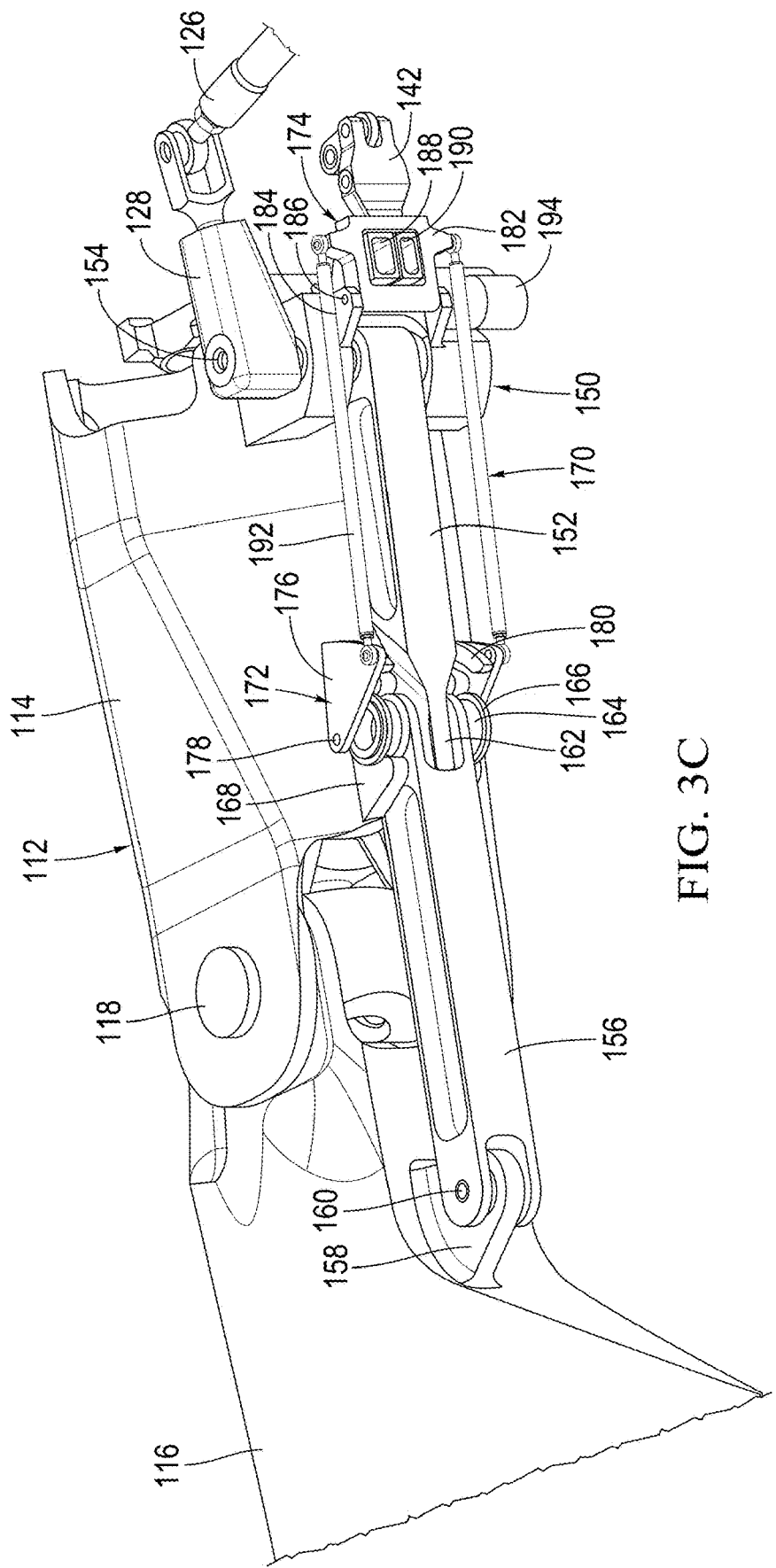

Each blade lock assembly 150 further includes a blade lock 170 having a fold lock position securing pivot joint 162 to cuff 114 and a pitch lock position securing cuff 114 to arm 142 of blade stop assembly 140. More specifically, each blade lock 170 includes a fold lock 172 and a pitch lock 174. Each fold lock 172 consists of a pair of arms 176 that are rotatably coupled to respective seats 168 of cuff 114 via connection members depicted as pins 178. Each arm 176 includes a wedge 180 having a bearing surface that contacts a respective roller element 166 and provides maximum contact force when fold lock 172 is fully engaged, as best seen in FIG. 3A. Each pitch lock 174 includes a hasp 182 that is rotatably coupled to a pair of lugs 184 of cuff 114 via a connection member depicted as pin 186. Each hasp 182 includes a central opening operable to selectively receive and retain a tab 188 of cuff 114 and a tab 190 of arm 142 therein, as best seen in FIG. 3C. In the illustrated embodiment, fold lock 172 and a pitch lock 174 are coupled together by a pair of adjustable connecting rods 192 such that a single actuator 194 is operable to shift blade lock 170 between the fold lock position, depicted in FIG. 3A, and the pitch lock position, depicted in FIG. 3C. It should be appreciated, however, that a fold lock and a pitch lock for use with the embodiments disclosed herein could alternatively operate independent of one another.

The operation of transitioning mechanism 100 will now be described with reference to an exemplary flight of tiltrotor aircraft 10. For vertical takeoff and hovering in helicopter flight mode, as best seen in FIG. 1A, and low speed forward flight in proprotor forward flight mode, as best seen in FIG. 1B, tiltrotor aircraft 10 is in rotary flight mode. To achieve this operational mode, engines 24a, 24b are in turboshaft mode to provide torque and rotational energy to proprotor assemblies 20a, 20b, gimbal lock 130 is in the disengaged position enabling the gimballing degree of freedom of rotor assemblies 102, as best seen in FIG. 2A, arms 142 of blade stop assembly 140 are in the radially contracted orientation providing clearance for rotor assemblies 102, as best seen in FIG. 2A, and each of the blade lock assemblies 150 is enabling the pitching degree of freedom and disabling the folding degree of freedom of rotor blade assemblies 112, as best seen in FIG. 3A. In this configuration, swash plate 120 collectively and cyclically controls the pitch of rotor blade assemblies 112 responsive to pilot input.

When it is desired to transition tiltrotor aircraft 10 from low speed forward flight in proprotor forward flight mode, as best seen in FIG. 1B, to high speed forward flight in airplane forward flight mode, as best seen in FIG. 1D, transitioning mechanism 100 is used to safely achieve this result. As a preliminary step, engines 24a, 24b are transitioned from turboshaft mode to turbofan mode until forward thrust is solely generated by engines 24a, 24b and tiltrotor aircraft 10 is in non-rotary flight mode. Swash plate 120 is now used to collectively shift the pitch of rotor blade assemblies 112 to the feathering position, as best seen in FIG. 1C, wherein rotor blades 116 act as brakes to aerodynamically stop the rotation of rotor assemblies 102. To disable the gimballing degree of freedom of rotor assembly 102, actuator 136 is operated to cause lift ring 138 to raise actuation ring 134, which in turn raises conical ring 132 into conical receptacle 108 of rotor hub 106, as best seen in FIG. 2B. At the same time, responsive to lift ring 138 raising actuation ring 134, arms 142 shift from the radially contracted orientation to the radially extended orientation, as best seen in FIG. 2B, to provide a positive stop for rotor blade assemblies 112.

Next, actuators 194 are operated to shift blade locks 170 from the fold lock position, depicted in FIG. 3A, to the pitch lock position, depicted in FIG. 3C. Actuator 194 simultaneously causes hasp 182 to rotate relative to lugs 184 of cuff 114 about pin 186 and arms 176 to rotate relative to seats 168 of cuff 114 about pins 178, as best seen in FIG. 3B. At the end of travel, hasp 182 has received tab 188 of cuff 114 and tab 190 of arm 142 in a central opening, as best seen in FIG. 3C, which disables the pitching degree of freedom of rotor blade assemblies 112. Also, at the end of travel, wedges 180 have cleared the lower portion of seats 168, which enables the folding degree of freedom of rotor blade assemblies 112. Swash plate 120 is now used to collectively shift rotor blade assemblies 112 from the radially outwardly extending feathering position, as best seen in FIG. 1C, to a folded orientation, as best seen in FIGS. 1D and 2G.

Figure 2F:
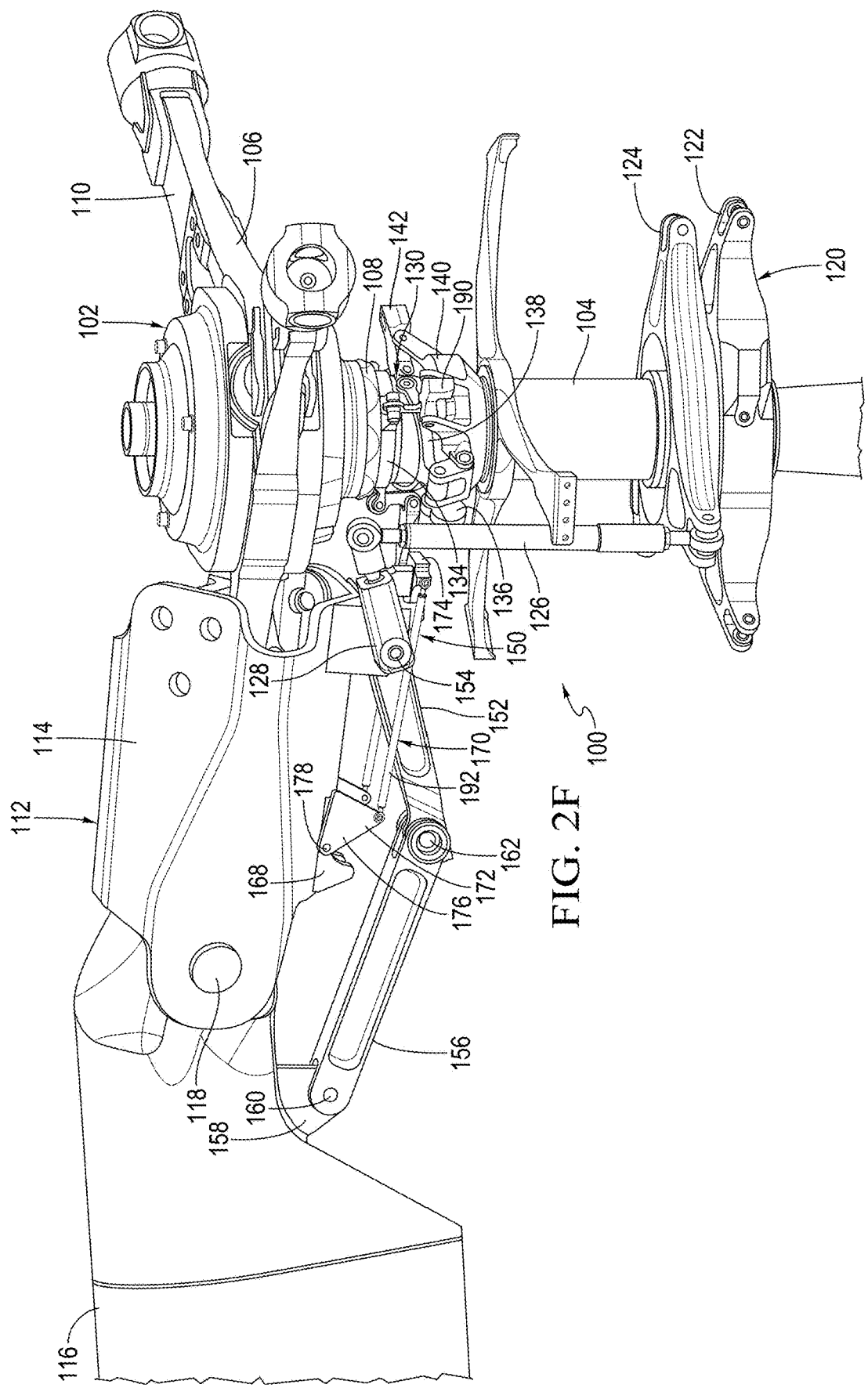
Figure 2G:
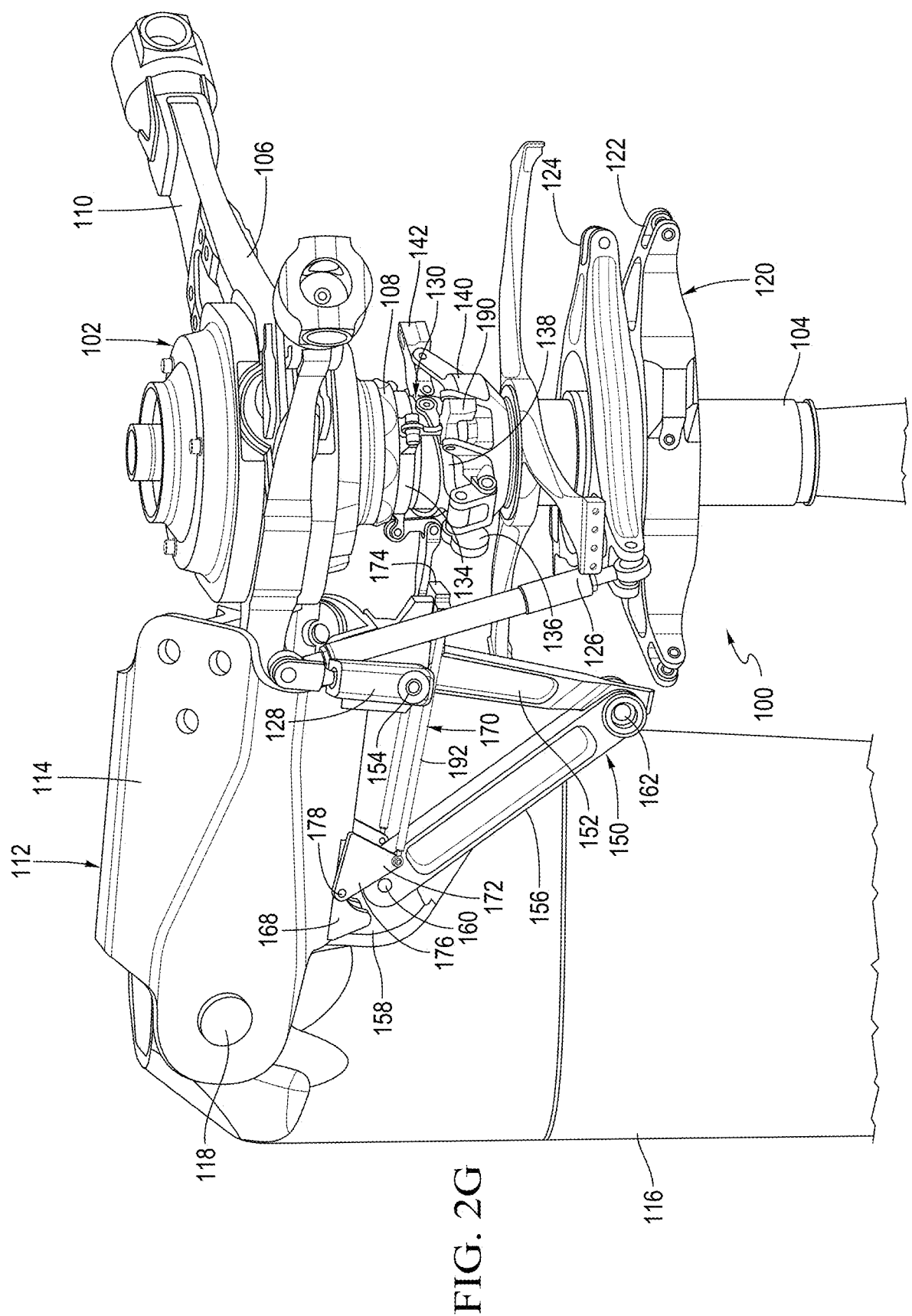
Figure 3D:
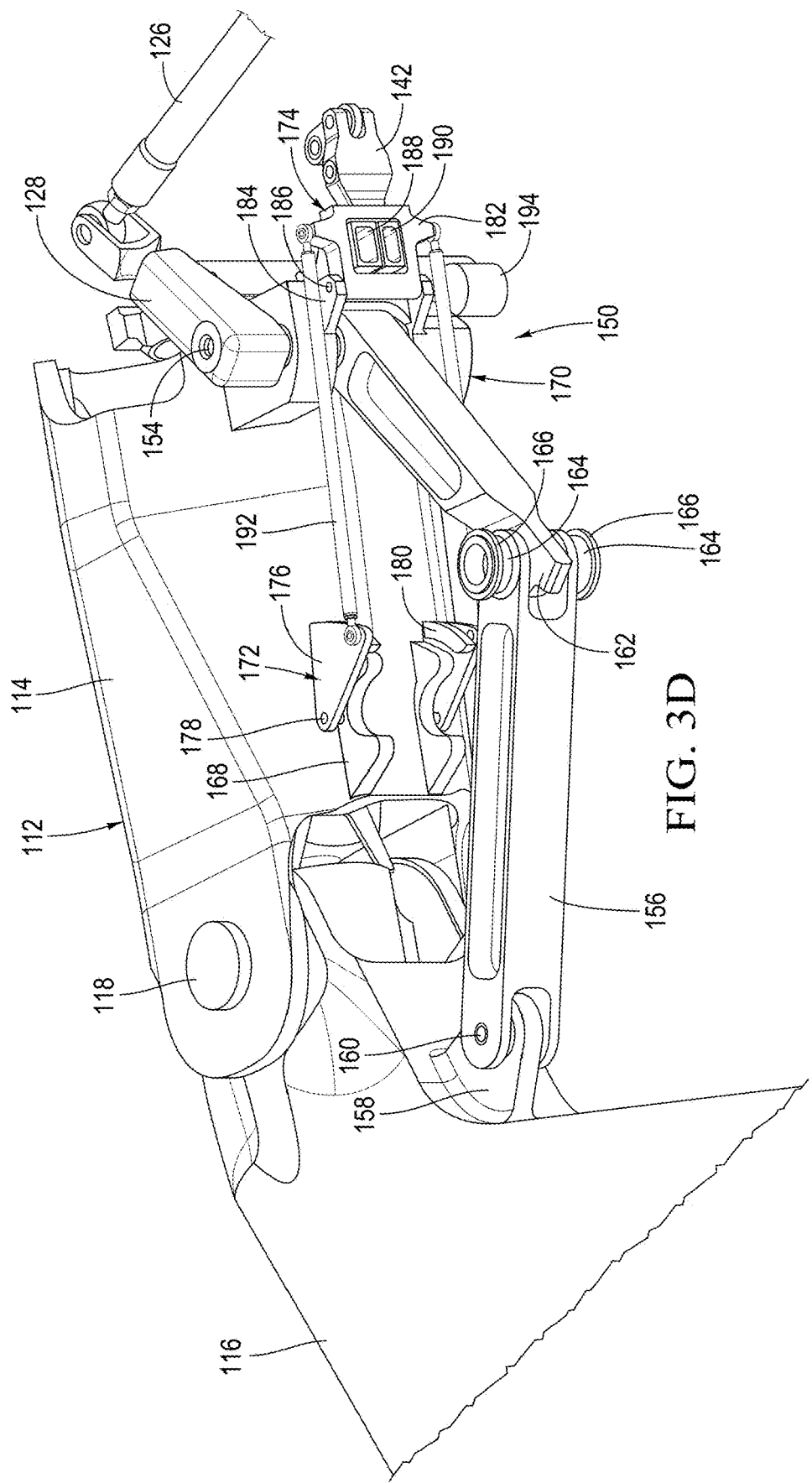
Figure 3E:
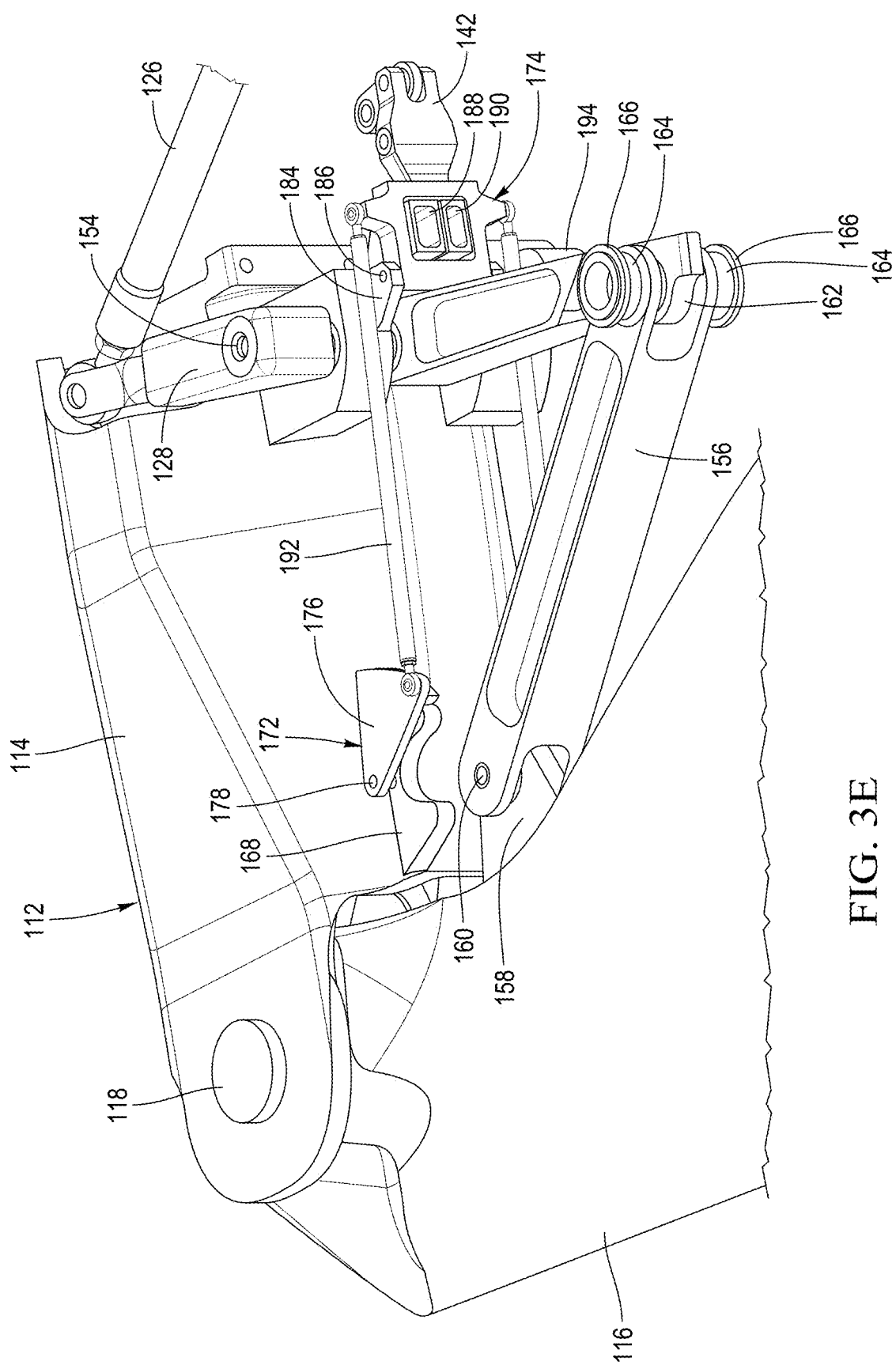
Figure 4:
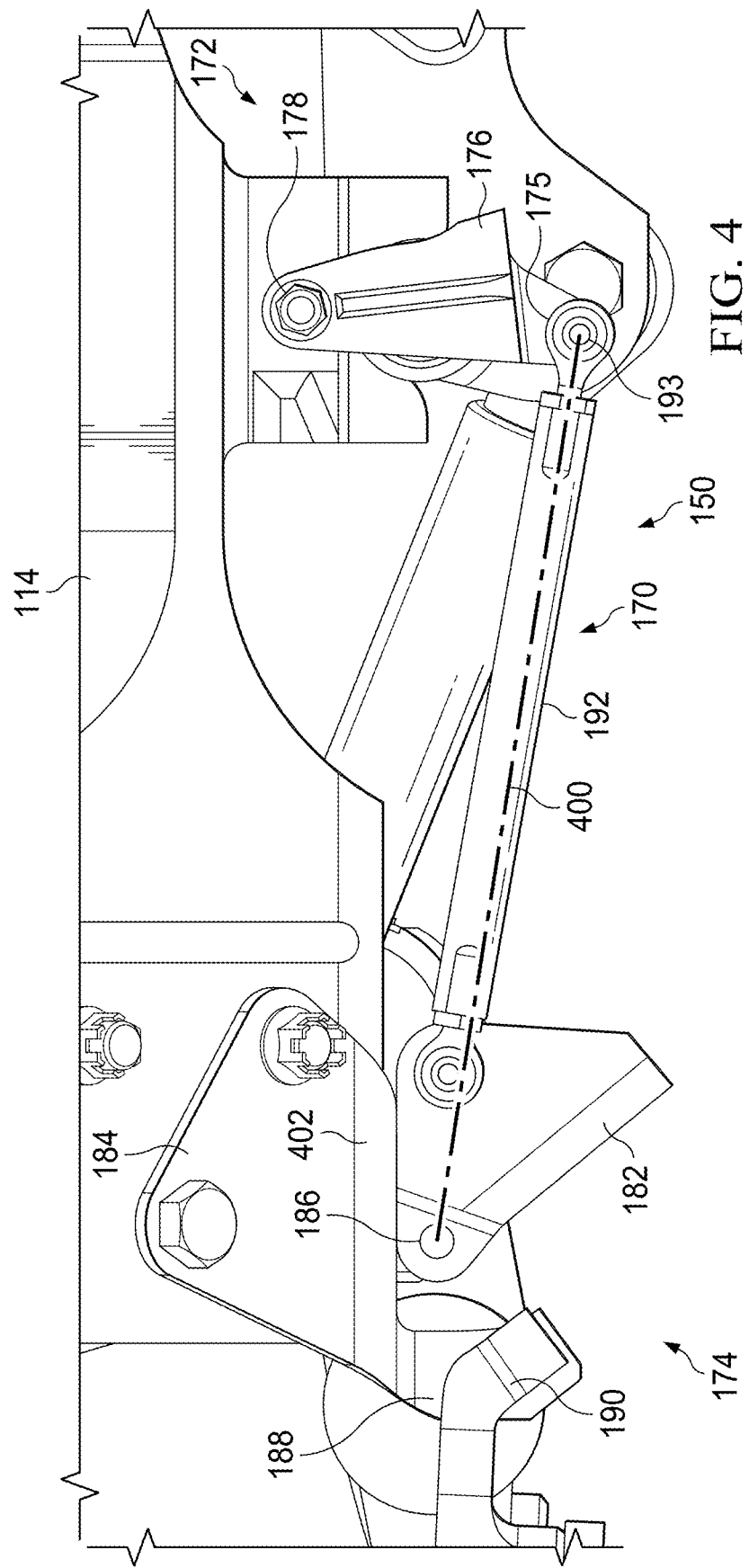
FIGS. 4 and 5 illustrate an exemplary over-centering blade lock in the fold locked position.

With the pitching degree of freedom disabled, rise and fall of swash plate 120 now rotates pitch horn 128 relative to cuff 114, which in turn causes rotation of crank 152. The rotation of crank 152 causes rotation of link 156 relative to lug 158 about pin 160, rotation in pivot joint 162, which disengages flanges 164 from seats 168, and rotation of rotor blade 116 relative to cuff 114 about pin 118, as best seen in FIGS. 2F and 3D. Continued operation of swash plate 120 causes continued rotation of pitch horn 128, crank 152, link 156 and rotor blade 116 until rotor blade 116 reaches its desired folded orientation, as best seen in FIGS. 2G and 3E. Tiltrotor aircraft 10 is now in airplane flight mode, which is the high speed forward flight mode of tiltrotor aircraft 10 and is a non-rotary flight mode. In this operational mode, engines 24a, 24b are in turbofan mode providing no torque and rotational energy to proprotor assemblies 20a, 20b, gimbal lock 130 is in the engaged position disabling the gimballing degree of freedom of rotor assemblies 102, arms 142 of blade stop assembly 140 are in the radially extended orientation providing a position stop and coupling for rotor blade assemblies 112, and each of the blade lock assemblies 150 is disabling the pitching degree of freedom and enabling the folding degree of freedom of rotor blade assemblies 112.

When it is desired to transition back to proprotor forward flight mode, as best seen in FIG. 1B, from airplane forward flight mode, as best seen in FIG. 1D, transitioning mechanism 100 is used to safely achieve this result. With the pitching degree of freedom disabled, lowering swash plate 120 rotates pitch horn 128 relative to cuff 114, which in turn causes rotation of crank 152, link 156 and the unfolding of rotor blade 116, as best seen in FIGS. 2F and 3D. Continued operation of swash plate 120 causes continued rotation of pitch horn 128, crank 152, link 156 and rotor blade 116 until rotor blade 116 reaches its desired radially outwardly extending orientation, as best seen in FIG. 2E. In this position, crank 152 and link 156 are generally aligned such that flanges 164 have entered seats 168, as best seen in FIG. 3C.

Figure 2D:
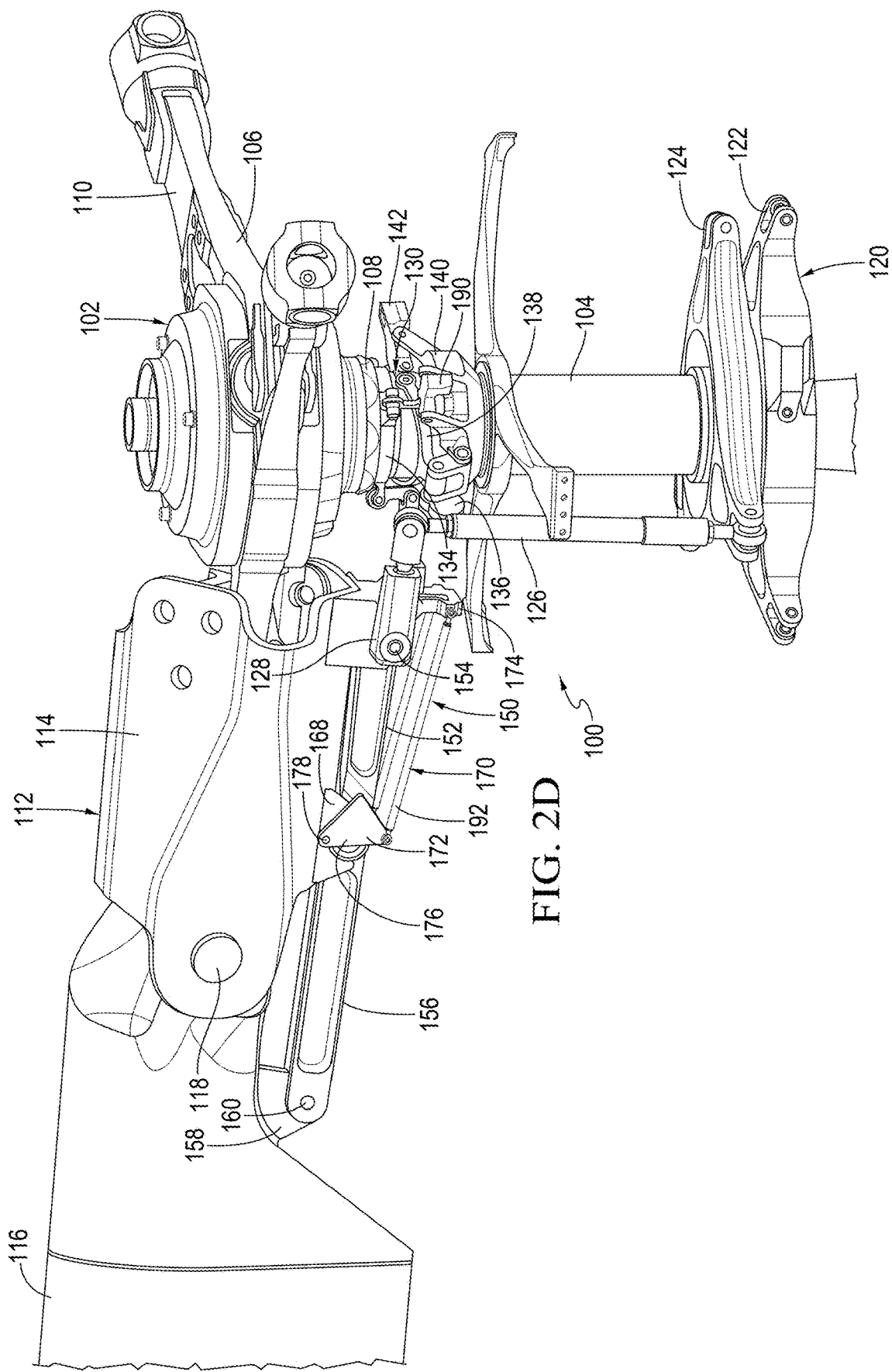
Figure 2E:
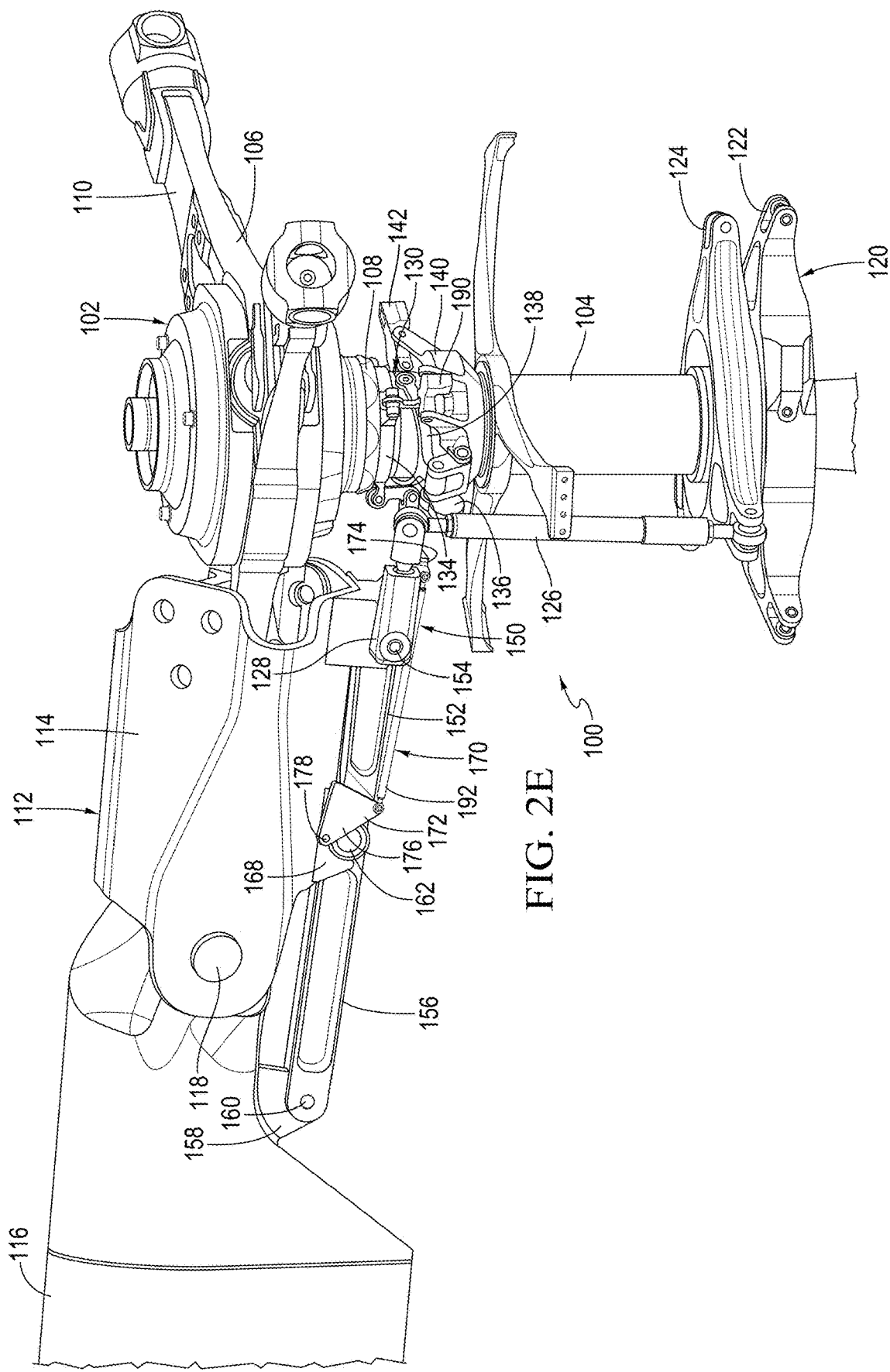

Next, actuators 194 are operated to shift blade locks 170 from the pitch lock position, depicted in FIG. 3C, to the fold lock position, depicted in FIGS. 2D and 3A. Actuator 194 simultaneously causes hasp 182 to rotate relative to lugs 184 of cuff 114 about pin 186 and arms 176 to rotate relative to seats 168 of cuff 114 about pins 178, as best seen in FIGS. 2D and 3B. At the end of travel, hasp 182 is remote from tab 188 of cuff 114 and tab 190 of arm 142, as best seen in FIG. 3A, which enables the pitching degree of freedom of rotor blade assemblies 112. Also, at the end of travel, wedges 180 have contacted roller element 166 seating flanges 164 tightly within seats 168 and disabling the folding degree of freedom of rotor blade assembly 112, as best seen in FIG. 3A. Swash plate 120 may now be used to collectively shift rotor blade assemblies 112 from the feathering position, as best seen in FIG. 1C, to a windmilling orientation.

To enable the gimballing degree of freedom of rotor assembly 102, actuator 136 is operated to cause lift ring 138 to lower actuation ring 134, which in turn lowers conical ring 132 out of engagement with conical receptacle 108 of rotor hub 106, as best seen in FIG. 2A. At the same time, responsive to lift ring 138 lower actuation ring 134, arms 142 shift from the radially extended orientation to the radially contracted orientation, as best seen in FIG. 2A, to provide clearance for rotor blade assemblies 112. Next, engines 24a, 24b are transitioned from turbofan mode to turboshaft mode such that forward thrust is provided by proprotor assemblies 20a, 20b and tiltrotor aircraft 10 is in the rotary flight mode. From this configuration, tiltrotor aircraft 10 may now be transitioned to helicopter mode when it is desired to hover and/or land the aircraft.

Figure 5:
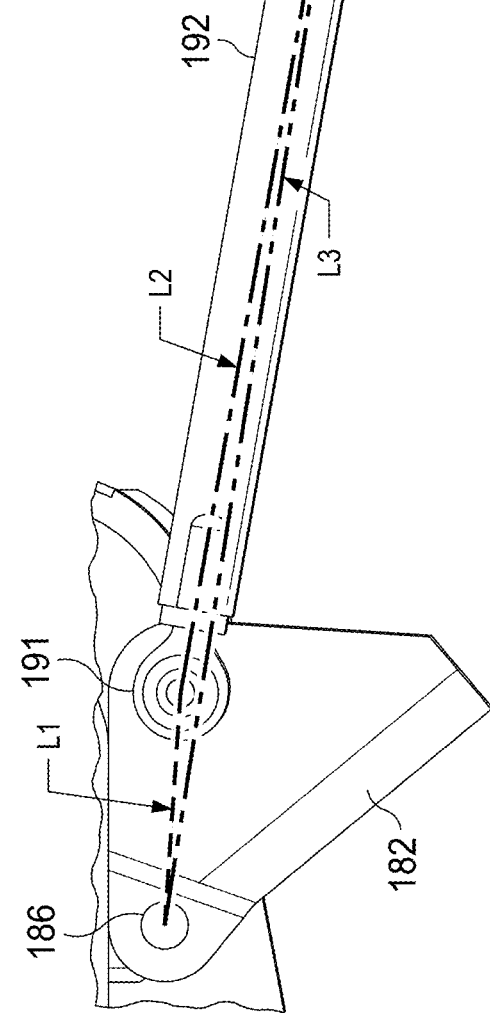
Figure 6:
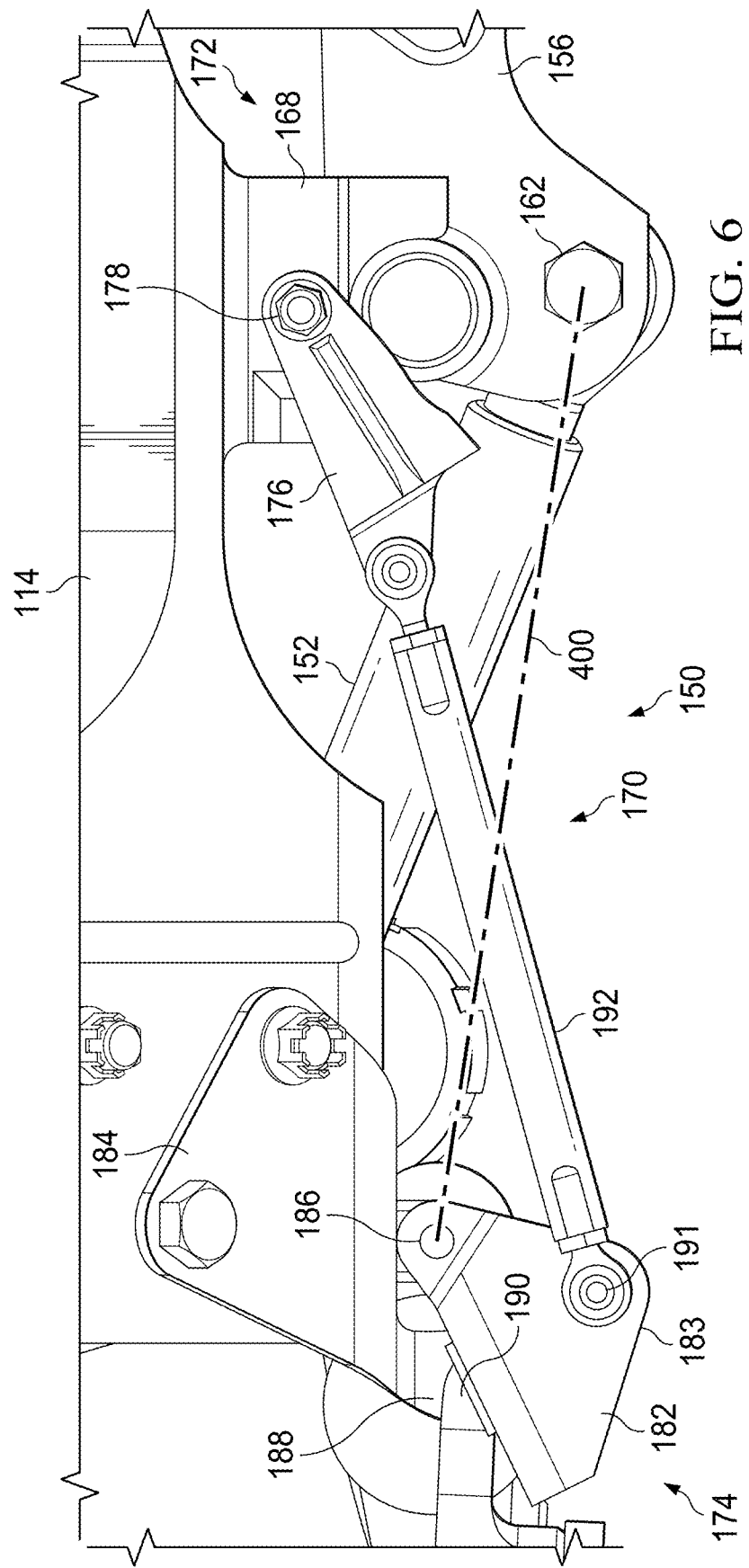
FIG. 6 illustrates an exemplary over-centering blade lock in the pitch locked position.

Operation of an exemplary over-centering blade lock 170 is described with additional reference to FIGS. 4-7. Blade lock assembly 150 includes an over-centering blade lock 170 having a fold lock position securing pivot joint 162 to cuff 114 and a pitch lock position securing cuff 114 to arm 142 of blade stop assembly 140 (FIG. 2C). Each over-centering blade lock 170 includes a fold lock 172 and a pitch lock 174. Each fold lock 172 consists of a pair of arms 176, e.g. levers, that are rotatably coupled to respective seats 168 of cuff 114 via connection members depicted as pins 178. In some embodiments, each arm 176 includes a wedge 180 having a bearing surface that contacts a respective roller element 166 and provides maximum contact force on link 156 when fold lock 172 is fully engaged, as best seen in FIG. 3A. The maximum contact force may correspond to center position 400 of over-centering blade lock 170. Each pitch lock 174 includes a hasp 182 that is rotatably coupled to a pair of lugs 184 of cuff 114 via a connection member depicted as pin 186. Each hasp 182 includes a central opening operable to selectively receive and retain a tab 188 of cuff 114 and a tab 190 of arm 142 therein, as best seen in FIGS. 3C and 6. In the illustrated embodiment, fold lock 172 and a pitch lock 174 are coupled together by a pair of adjustable connecting rods or fold links 192 such that a single actuator 194 is operable to shift over-centering blade lock 170 between the fold lock position, depicted in FIGS. 4 and 5, and the pitch lock position, depicted in FIG. 6.

Over-centering blade lock 170 uses geometry and spring force to mechanically secure fold lock 172 in the blade fold lock position for rotary flight. In a traditional blade lock assembly, an electric motor, such as actuator 194, provides continuous pressure on hasp 182 and fold link 192 to maintain arm 176 in the fold lock position. Over-centering blade lock 170 provides a passive lock to maintain fold lock 172 in the blade fold lock position without requiring a secondary locking force.

Each fold link 192 is pivotally connected at a first end 191 to hasp 182 at a position 183 and pivotally connected at a second end 193 to arm 176 of fold lock 172 at position 175. Hasp 182 serves as bellcrank that pivots about connection member 186. Axis 400 illustrates the center position of over-centering blade lock 170, extending through pivot point 186 and pivot joint 162, and the position of fold link 192 when arm 176 is in the fold lock position. When hasp 182 is rotated about connection member 186 to the position contacting hard stop 402, illustrated as lug 184 secured to cuff 114, fold link 192 is located over-center position 400.

In the fold lock position, fold link 192 and hasp 182 are longer than a resolved length of axis 400 so that fold link 192 is deflected or compressed when rotated to the over-center position. As illustrated in FIG. 5, axis 400 has a resolve length (L3) extending from pivot connection 186 (bellcrank axis) of hasp 182 to the pivot connection 193 of link 192 to arm 176. Hasp 182 has a radius or length (L1) from hasp pivot connection 186 to first end pivot connection 191 of link 192 to hasp 182. Fold link 192 has a length (L2) from first end pivot connection 191 to second end pivot connection 193 at arm 176. Thus, in the fold locked position the length (L1) of hasp 182 plus the length (L2) of link 192 is greater than the resolved distance (L3) from bellcrank axis 186 to pivot connection 193 of fold link 192 to arm 176. The deflected or compressed fold link 192 provides a spring force holding arm 176 in the locked position and resisting a counter-force urging arm 176 to an unlocked position. In this over-center position, link 192 and hasp 182 resist a counter-force that pushes on arm 176 and resists backdriving blade lock 170 out of the blade fold lock position of FIG. 4. The amount of over-center interference is the limit of deflection of over-centering blade lock 170 before arm 176 is allowed to move out of the locked position. Thus, if the over-centering blade lock 170 system deflects or compresses more than the over-center interference arm 176 can move out of the lock position or at least arm 176 will not be wedged with link 156 with sufficient force to prevent folding or partial folding of the proprotor blade. For example, if the combination of hasp 182 (L1) and fold link 192 (L2) are 0.1 inches longer than resolved distance of axis 400, then the blade lock system can deflect or compress approximately 0.1 inches before unlocking.

FIG. 6 shows fold link 192 in a below-center position with blade lock 170 out of the blade fold lock position enabling the folding degree of freedom of the rotor blade assembly and hasp 182 in the pitch lock position disabling the pitching degree of freedom of the rotor blade assembly.

Figure 7:
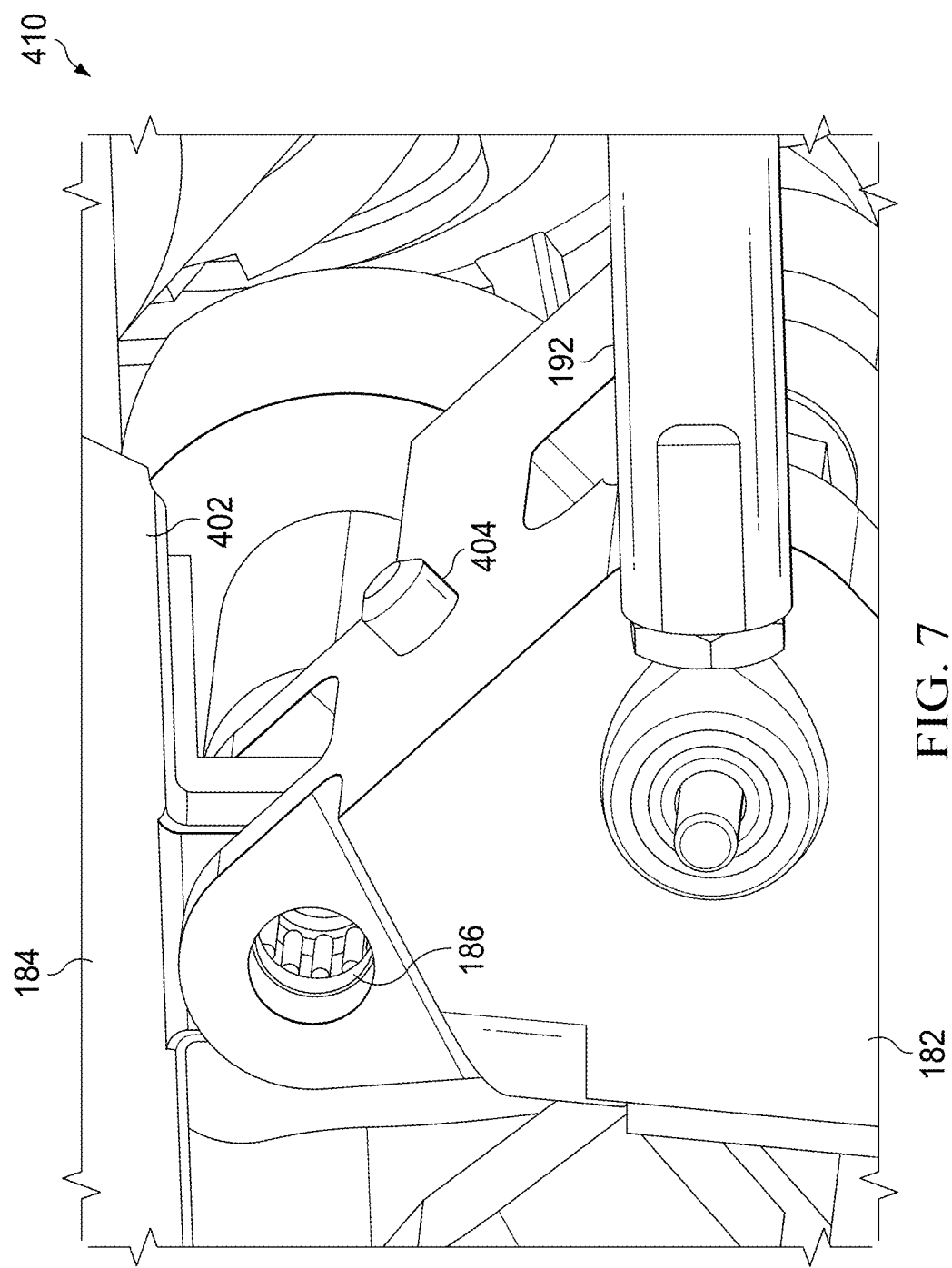
FIG. 7 illustrates an exemplary hard stop adjustment mechanism.

FIG. 7 illustrates an exemplary adjustable hard stop mechanism generally designated with the numeral 410. With additional reference to FIGS. 4-6, adjustable hard stop mechanism 410 provides a means to adjust the over-center location of fold link 192 relative to center position 400 when hasp 182 contacts hard stop 402 and sets the preload of the system in the locked position. The preload identifies the force required to move fold link 192 from the over-center position to unlock fold lock 172. The preload force is the force applied by arm 176 to link 176 to prevent link 156 and thus the proprotor blade from folding. Adjustable hard stop mechanism 410 includes a set screw 404 threadedly connected to one of hasp 182 or cuff 114, for example lug 184. In the example of FIG. 7, set screw 404 is threadedly connected to hasp 182 such that the length of set screw 404 extending from hasp 182 can be varied.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include such elements or features.

The term "substantially," "approximately," and "about" is defined as largely but not necessarily wholly what is specified (and includes what is specified; e.g., substantially 90 degrees includes 90 degrees and substantially parallel includes parallel), as understood by a person of ordinary skill in the art. The extent to which the description may vary will depend on how great a change can be instituted and still have a person of ordinary skill in the art recognized the modified feature as still having the required characteristics and capabilities of the unmodified feature. In general, but subject to the preceding, a numerical value herein that is modified by a word of approximation such as "substantially," "approximately," and "about" may vary from the stated value, for example, by 0.1, 0.5, 1, 2, 3, 4, 5, 10, or 15 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure and that they may make various changes, substitutions, and alterations without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A method for enabling and disabling a folding degree of freedom and a pitching degree of freedom of a rotor blade assembly of a tiltrotor aircraft, the method comprising:
    operating a blade lock to enable or disable the folding degree of freedom and the pitching degree of freedom of the rotor blade assembly, the blade lock comprising:
        a crank and a blade link coupled at a crank pivot point, the blade link rotatably coupled to a rotor blade and the crank rotatably coupled to a cuff of the rotor blade assembly and operable to rotate relative to the cuff;
        a lever pivotally connected to the cuff at a lever pivot point and having a fold locked position securing a crank pivot joint to the cuff and disabling the folding degree of freedom and a fold unlocked position enabling the folding degree of freedom;
        a bellcrank pivotally connected to the cuff at a bellcrank pivot point;
        a center position extending through the bellcrank pivot point and the crank pivot point;
        a fold link having an end pivotally connected to the lever at a link-lever connection and an opposite end pivotally connected to the bellcrank at a link-bellcrank connection; and
        a projection extending from the bellcrank at a location between the bellcrank pivot point and the link-bellcrank connection;
    moving the lever from the fold unlocked position to the fold locked position with the fold link in the center position and the projection not in direct contact with the cuff; and
    securing the lever in the fold locked position by rotating the fold link to an over-center position with the projection in direct contact with the cuff, wherein the fold link is deflected or compressed in the center position when the fold link is rotated between the fold unlocked position and the over-center position.

2. The method of claim 1, wherein moving the lever from the fold unlocked position to the fold locked position comprises operating an actuator coupled to the bellcrank to rotate the fold link to the center position and to the over-center position.

3. The method of claim 1, wherein the bellcrank is a pitch lock enabling the pitching degree of freedom when the lever is in the fold locked position and disabling the pitching degree of freedom when the lever is in the fold unlocked position.

4. The method of claim 1, wherein the projection is a set screw.

5. The method of claim 1, wherein the projection is moveable to change a distance the projection extends from the bellcrank.

6. The method of claim 1, wherein the projection is threadedly connected to the bellcrank.

7. The method of claim 1, further comprising an actuator coupled to the bellcrank to rotate the fold link to the center position and to the over-center position; and
    the projection is moveable to change a distance that the projection extends from the bellcrank.

8. The method of claim 7, wherein the projection is threadedly connected to the bellcrank.

9. The method of claim 7, wherein the bellcrank is a pitch lock enabling the pitching degree of freedom when the lever is in the fold locked position and disabling the pitching degree of freedom when the lever is in the fold unlocked position.

10. A tiltrotor aircraft having a rotary and a non-rotary flight modes, the tiltrotor aircraft comprising:
   a mast;
   a rotor assembly having a gimballing degree of freedom relative to the mast, the rotor assembly including a plurality of rotor blade assemblies each having a pitching degree of freedom and a folding degree of freedom;
   a gimbal lock positioned about the mast, the gimbal lock having a disengaged position relative to the rotor assembly, enabling the gimballing degree of freedom, in the rotary flight mode and an engaged position relative to the rotor assembly, disabling the gimballing degree of freedom, in the non-rotary flight mode;
   a blade stop assembly positioned about the mast, the blade stop assembly including a plurality of arms having a radially contracted orientation, in the rotary flight mode and a radially extended orientation, in the non-rotary flight mode;
   a blade lock assembly operably associated with each rotor blade assembly to enable and disable a folding degree of freedom and a pitching degree of freedom of a rotor blade assembly, the blade lock assembly comprising:
      a crank and a blade link coupled at a crank pivot point, the blade link rotatably coupled to a rotor blade and the crank rotatably coupled to a cuff of the rotor blade assembly and operable to rotate relative to the cuff;
      a lever pivotally connected to the cuff at a lever pivot point and having a fold locked position securing a crank pivot joint to the cuff disabling the folding degree of freedom and a fold unlocked position enabling the folding degree of freedom;
      a bellcrank pivotally connected to the cuff at a bellcrank pivot point;
      a center position extending through the bellcrank pivot point and the crank pivot point;
      a fold link having an end pivotally connected to the lever at a link-lever connection and an opposite end pivotally connected to the bellcrank at a link-bellcrank connection; and
      a projection extending from the bellcrank at a location between the bellcrank pivot point and the link-bellcrank connection:
      wherein the lever is unsecured in the fold locked position when the fold link is in the center position and the projection is not in direct contact with the cuff;
      wherein the lever is secured in the fold locked position when the fold link is in an over-center position and the projection is in direct contact with the cuff; and
      wherein the fold link is deflected or compressed in the center position when the fold link is rotated between the fold unlocked position and the over-center position.

11. The tiltrotor aircraft of claim 10, comprising an actuator coupled to the bellcrank to rotate the fold link to the center position and to the over-center position.

12. The tiltrotor aircraft of claim 10, wherein the bellcrank is a pitch lock configured to enable the pitching degree of freedom when the lever is in the fold locked position and to disable the pitching degree of freedom when the lever is moved out of the fold locked position.

13. The tiltrotor aircraft of claim 10, wherein the projection is a set screw.

14. The tiltrotor aircraft of claim 10, wherein the projection is moveable to change a distance that the projection extends from the bellcrank.

15. The tiltrotor aircraft of claim 10, wherein the projection is threadedly connected to the bellcrank.

16. The tiltrotor aircraft of claim 10, comprising an actuator coupled to the bellcrank to rotate the fold link to the center position and to the over-center position; and the projection is moveable to change a distance that the projection extends from the bellcrank.

17. The tiltrotor aircraft of claim 16, wherein the projection is threadedly connected to the bellcrank.

18. The tiltrotor aircraft of claim 16, wherein the bellcrank is a pitch lock configured to enable the pitching degree of freedom when the lever is in the fold locked position and to disable the pitching degree of freedom when the lever is moved out of the fold locked position.

* * * * *